United States Patent
Higashino

(10) Patent No.: US 8,284,123 B2
(45) Date of Patent: *Oct. 9, 2012

(54) LIQUID CRYSTAL DISPLAY APPARATUS, LIQUID CRYSTAL DISPLAY APPARATUS DRIVING CIRCUIT, LIQUID CRYSTAL DISPLAY APPARATUS SOURCE DRIVER, AND LIQUID CRYSTAL DISPLAY APPARATUS CONTROLLER

(75) Inventor: Hiroyuki Higashino, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 496 days.

This patent is subject to a terminal disclaimer.

(21) Appl. No.: 12/312,834

(22) PCT Filed: Jul. 10, 2007

(86) PCT No.: PCT/JP2007/063724
§ 371 (c)(1),
(2), (4) Date: May 28, 2009

(87) PCT Pub. No.: WO2008/065773
PCT Pub. Date: Jun. 5, 2008

(65) Prior Publication Data
US 2010/0045708 A1  Feb. 25, 2010

(30) Foreign Application Priority Data

Nov. 29, 2006 (JP) .................................. 2006-322630

(51) Int. Cl.
  G09G 3/28 (2006.01)
  G09G 5/00 (2006.01)
(52) U.S. Cl. .......................................... 345/69; 345/204
(58) Field of Classification Search ...................... 345/69
  See application file for complete search history.

(56) References Cited

U.S. PATENT DOCUMENTS 5,402,142 A  3/1995 Okada et al.
(Continued)

FOREIGN PATENT DOCUMENTS

JP  5-053534  3/1993
(Continued)

OTHER PUBLICATIONS

International Search Report dated Aug. 3, 2007 from the Japan Patent Office.

(Continued)

*Primary Examiner* — Alexander S Beck
*Assistant Examiner* — Mihir Rayan
(74) *Attorney, Agent, or Firm* — Harness, Dickey & Pierce, P.L.C.

(57) ABSTRACT

In one embodiment of the present invention, a liquid crystal display apparatus driving circuit selectively supplies positive polarity gray scale voltages or negative polarity gray scale voltages to video signal lines as video signals. The circuit includes a gray scale voltage generation circuit for generating a gray scale voltage for display; and first and second gray scale voltage adjustment sections included in the circuit, for increasing positive and negative polarity gray scale voltages while maintaining a voltage difference between the positive and negative polarity gray scale voltages and respectively adjust a center potentials of the positive and negative polarity gray scale voltages. This makes it possible to provide the liquid crystal display apparatus driving circuit which can make the center values of the positive and negative polarity gray scale voltages proximate to values which makes it possible to further reduce the flicker phenomenon without changing the gray scale property.

20 Claims, 14 Drawing Sheets

U.S. PATENT DOCUMENTS

| | | | |
|---|---|---|---|
| 5,583,532 A | 12/1996 | Watanabe | |
| 5,640,174 A * | 6/1997 | Kamei et al. | 345/89 |
| 5,877,717 A * | 3/1999 | Tu et al. | 341/150 |
| 6,151,005 A | 11/2000 | Takita et al. | |
| 6,310,592 B1 * | 10/2001 | Moon et al. | 345/87 |
| 6,512,505 B1 * | 1/2003 | Uchino et al. | 345/96 |
| 6,621,478 B1 | 9/2003 | Sakaguchi et al. | |
| 6,831,620 B1 * | 12/2004 | Nishikubo et al. | 345/87 |
| 7,023,458 B2 | 4/2006 | Kudo et al. | |
| 8,094,108 B2 * | 1/2012 | Higashino et al. | 345/89 |
| 2003/0201959 A1 | 10/2003 | Sakaguchi | |
| 2004/0070579 A1 | 4/2004 | Kurihara | |
| 2005/0200584 A1 | 9/2005 | Kudo et al. | |
| 2005/0231497 A1 | 10/2005 | Harada | |
| 2006/0033695 A1 | 2/2006 | Kudo et al. | |
| 2006/0087483 A1 | 4/2006 | Takada et al. | |
| 2008/0012840 A1 | 1/2008 | Higashino et al. | |

FOREIGN PATENT DOCUMENTS

| | | |
|---|---|---|
| JP | 5-203918 | 8/1993 |
| JP | 6-348236 | 12/1994 |
| JP | 7-92937 | 4/1995 |
| JP | 7-333576 | 12/1995 |
| JP | 11-133919 | 5/1999 |
| JP | 2001-22325 | 1/2001 |
| JP | 2001-100711 | 4/2001 |
| JP | 2001-242833 | 9/2001 |
| JP | 2004-205896 | 7/2004 |
| WO | WO 2004/003641 | 1/2004 |
| WO | WO 2006082791 | * 10/2006 |

OTHER PUBLICATIONS

International Search Report (ISA/210), for WO 2008/065773, filed May 29, 2009.

Office Action dated Apr. 26, 2010 for U.S. Appl. No. 11/792,039.

Office Action dated Jul. 22, 2010 for U.S. Appl. No. 11/792,039.

Notice of Allowance dated Sep. 15, 2011 for U.S. Appl. No. 11/792,039.

* cited by examiner

LIQUID CRYSTAL DISPLAY APPARATUS, LIQUID CRYSTAL DISPLAY APPARATUS DRIVING CIRCUIT, LIQUID CRYSTAL DISPLAY APPARATUS SOURCE DRIVER, AND LIQUID CRYSTAL DISPLAY APPARATUS CONTROLLER

TECHNICAL FIELD

The present invention relates to (i) a liquid crystal display apparatus of an active matrix type etc. used in a display screen such as a display of a television apparatus and a monitor of a personal computer for example, and further to (ii) a liquid crystal display apparatus driving circuit, (iii) a liquid crystal display apparatus source driver, and (iv) a liquid crystal display apparatus controller, which are used for the liquid crystal display apparatus.

BACKGROUND ART

Conventionally, a liquid crystal display apparatus includes a liquid crystal panel in which: a plurality of scanning signal lines (gate signal lines) and a plurality of video signal lines (source signal lines) intersect with each other, and there are provided in a matrix manner a plurality of display pixels each of which is connected to the gate signal line and the source signal line so as to correspond to each of regions sectioned by both the lines. Each display pixel has: a liquid crystal capacitance Clc provided between a pixel electrode and a counter electrode; and a thin film transistor (TFT) whose gate electrode is connected to the gate signal line, whose source electrode is connected to the source signal line, and whose drain electrode is connected to the pixel electrode. As necessary, an auxiliary capacitance Cs is provided.

Source drivers are provided on a periphery of the liquid crystal panel so as to respectively correspond to the plurality of source signal lines, and each of the source drivers supplies, to a corresponding source signal line, a video signal for each display pixel connected to the source signal line. In order to prevent burn-out of liquid crystal, a positive polarity and a negative polarity of the video signal are alternately supplied to the counter electrode. Such driving of the liquid crystal panel is referred to as "inversion driving".

Further, gate drivers are provided on the periphery of the liquid crystal panel so that each of the gate drivers corresponds to a certain number of plural gate signal lines, and each of the gate drivers supplies, to a corresponding gate signal line, a scanning signal for selectively driving each display pixel connected to the gate signal line.

In each pixel, when the TFT is turned ON by the scanning signal, a video signal is supplied to the pixel electrode via the TFT, orientation of liquid crystal serving as a display medium sandwiched by both the electrodes changes in accordance with a potential difference between a counter electrode potential and a pixel electrode potential, and various kinds of images as well as texts, figures, and the like are displayed in a display screen by the whole pixels.

In the liquid crystal display apparatus, not only the liquid crystal capacitance Clc and the auxiliary capacitance Cs but also a parasitic capacitance Cgd between the gate and the drain of the TFT exists in each display pixel. Thus, the gate-drain parasitic capacitance Cgd causes a charge pull-in voltage (charge pull-in amount) ΔV represented by the following equation to occur in each pixel, and a voltage actually applied to the liquid crystal changes by the charge pull-in amount ΔV.

Note that, in the following (Equation 1), VGH represents a gate high voltage of the scanning signal line, and VGL represents a gate low voltage of the scanning signal line.

$$\Delta V = \{Cgd/(Cgd+Clc+Cs)\} \times (VGH-VGL) \quad \text{(Equation 1)}$$

Further, charge pull-in amounts ΔV are different from each other in the display screen of the liquid crystal panel, so that flicker occurs in the display screen (flicker phenomenon). The following two cases (1) and (2) are typical factors of the flicker phenomenon in the liquid crystal display apparatus.

(1) In the liquid crystal panel, a gate signal line has a wiring resistance and a parasitic capacitance, so that a waveform of a gate signal is more likely to be round as further away from a signal input terminal of the gate signal line, and the charge pull-in amounts ΔV each caused by the gate-drain parasitic capacitance Cgd become different from one another in the respective pixels. This difference between the charge pull-in amounts ΔV causes deviation between a center value of voltages applied to a liquid crystal layer at the time of positive-polarity driving and a center value of voltages applied to the liquid crystal layer at the time of negative-polarity driving, in the display screen of the liquid crystal panel. This causes imbalance, thereby resulting in occurrence of the flicker phenomenon.

(2) In the step of forming a pixel pattern on a glass substrate (glass board), an area size of the glass substrate may be so large that it is difficult to form the pixel pattern on the entire surface of the glass substrate by a single forming process, so that the forming process of the pixel pattern is performed plural times with respect to plural blocks into which the surface of the glass substrate is divided. In this case, due to an alignment position or a property of a pattern forming device, a deviation occurs between the gate-drain parasitic capacitances Cgd in the display screen of the liquid crystal panel. Due to the deviation between the parasitic capacitances Cgd, the difference occurs between the charge pull-in amounts ΔV each represented by the foregoing equation, so that deviation occurs between a center value of voltages applied to a liquid crystal layer at the time of positive-polarity driving and a center value of voltages applied to the liquid crystal layer at the time of negative-polarity driving, in the display screen of the liquid crystal panel. This results in the flicker phenomenon.

The flicker phenomenon (1) is caused by the round waveform of the gate signal. Generally, the gate signal lines are disposed in a horizontal direction in the display screen, so that it is possible to alleviate the flicker phenomenon by correcting a center value of the positive polarity gray scale voltage and a center value of the negative polarity gray scale voltage, in accordance with inclination of the charge pull-in amounts ΔV in the horizontal direction.

Further, the flicker phenomenon (2) is caused by the property in the step of forming the pixel pattern. Thus, in case where the forming process of the pixel pattern is performed plural times, it is possible to alleviate the flicker phenomenon by correcting the deviation between the charge pull-in amounts ΔV in respective formation blocks.

Further, for example, Patent Literature 1 discloses a liquid crystal display apparatus configured so that an element which can obtain a desired resistance value in response to an external input, e.g., a potentiometer, is incorporated into a gray scale voltage generation circuit so as to adjust a gray scale property without changing a circuit constant after designing a driving circuit.

CITATION LIST

Patent Literature 1
Japanese Patent Application Publication, Tokukai, No. 2001-22325 A (Publication Date: Jan. 26, 2001)

SUMMARY OF THE INVENTION

The aforementioned conventional two flicker phenomena are fundamentally different from each other in view of the factor, but the aforementioned flicker phenomena are caused by the deviation between the charge pull-in amounts ΔV in the display screen of the liquid crystal panel. Thus, it is possible to reduce the flicker phenomenon by adjusting a value of a gray scale voltage applied to the liquid crystal layer in accordance with the deviation between the charge pull-in amounts ΔV in the display screen of the liquid crystal panel.

However, the adjustment of the gray scale value changes not only the degree of the flicker phenomenon in the gray scales due to the unevenness of the center values of the positive polarity voltage and the negative polarity voltage, but also a gray scale property, e.g., a so-called Γ value, of the gray scales.

Further, a conventional liquid crystal display apparatus driving circuit allows for such adjustment that the flicker phenomenon at a certain point of the panel screen will not be viewed with eyes. Thus, in case where the adjustment is performed at the center of the panel for example, the balance between the positive polarity gray scale voltage and the negative polarity gray scale voltage is greatly impaired at the left and right sides of the panel, that is, the center values (center potentials) become uneven, so that the flicker phenomenon occurs.

Further, Patent Literature 1 aims to easily adjust the gray scale property after designing the driving circuit. Moreover, Patent literature 1 is such that: in case where the gray scale voltage is adjusted, a voltage difference between the positive polarity voltage and the negative polarity voltage in each gray scale changes, so that charge pull-in amounts in each gray scale change. There is such a problem that the change of the charge pull-in amounts causes deterioration of the flicker phenomenon. Further, Patent Literature 1 is totally silent about (i) a method for inputting serial data for gray scale voltage adjustment, (ii) a timing thereof, (iii) and the like.

The present invention was made in view of the foregoing problems, and an object thereof is to provide a liquid crystal display apparatus driving circuit and a liquid crystal display apparatus each of which allows the center values of the positive polarity gray scale voltage and the negative polarity gray scale voltage to be more proximate to a value for reducing the flicker phenomenon without changing the gray scale property.

In order to solve the foregoing problems, a liquid crystal display apparatus driving circuit, comprising a plurality of driving sections provided on a periphery of a display section in which a plurality of scanning signal lines and a plurality of video signal lines intersect with each other and a plurality of pixels are provided in a matrix manner, said plurality of driving sections each corresponding to a predetermined number of the video signal lines, said liquid crystal display apparatus driving circuit selectively supplying positive polarity gray scale voltages or negative polarity gray scale voltages to the video signal lines as video signals, each of the driving sections comprising: a gray scale voltage generation circuit for generating a gray scale voltage for display; and first and second gray scale voltage adjustment sections included in the gray scale voltage generation circuit, for increasing a positive polarity gray scale voltage and a negative polarity gray scale voltage while maintaining a voltage difference between the positive polarity gray scale voltage and the negative polarity gray scale voltage and respectively adjust a center potential of the positive polarity gray scale voltage and a center potential of the negative polarity gray scale voltage.

Further, in order to solve the foregoing problems, a liquid crystal display apparatus driving circuit, comprising a plurality of driving sections provided on a periphery of a display section in which a plurality of scanning signal lines and a plurality of video signal lines intersect with each other and a plurality of pixels are provided in a matrix manner, said plurality of driving sections each corresponding to a predetermined number of the video signal lines, said liquid crystal display apparatus driving circuit selectively supplying positive polarity gray scale voltages or negative polarity gray scale voltages to the video signal lines as video signals, each of the driving sections comprising: a gray scale voltage generation circuit for generating a gray scale voltage for display; and first and second gray scale voltage adjustment sections included in the gray scale voltage generation circuit, for increasing a positive polarity gray scale voltage and a negative polarity gray scale voltage while maintaining a voltage difference between the positive polarity gray scale voltage and the negative polarity gray scale voltage and respectively adjust a center potential of the positive polarity gray scale voltage and a center potential of the negative polarity gray scale voltage, wherein the driving section inclines center potentials of the corresponding positive polarity gray scale voltages and the corresponding negative polarity gray scale voltages.

The positive grayscale voltage and the negative gray scale voltage are increased to compensate drop of a voltage applied to the liquid crystal which drop corresponds to the charge pull-in amount ΔV in the display screen of the liquid crystal panel.

According to the foregoing configuration, each driving section includes the gray scale voltage generation circuit having the gray scale voltage adjustment section, so that it is possible to perform voltage adjustment for adjusting the center potentials of the positive polarity gray scale voltage and the negative gray scale voltage. Further, the difference between the positive polarity gray scale voltage and the negative polarity gray scale voltage is maintained, so that it is possible to prevent the balance thereof from being impaired, that is, it is possible to prevent the gray scale property from being changed.

Particularly, the gray scale voltage generation circuit includes the first and second gray scale voltage adjustment sections which can respectively generate adjustment voltages different from each other. Thus, by using the adjustment voltages different from each other, it is possible for each driving section to generate adjustment voltages independent from each other so that there is a difference between a center potential of the positive polarity gray scale voltages and a center potential of the negative polarity gray scale voltages. Thus, it is possible to generate an output voltage whose waveform is more proximate to a waveform having an inclination of the most ideal output voltage allowing for reduction of the flicker phenomenon.

Further, the liquid crystal display apparatus driving circuit of the present invention may be configured so that each of the driving sections comprising a DA conversion circuit provided as a subsequent stage of the gray scale voltage generation circuit, wherein the DA conversion circuit includes: a first input terminal for receiving the positive polarity gray scale voltage and the negative polarity gray scale voltage outputted from the first gray scale voltage adjustment section; a second input terminal for receiving the positive polarity gray scale voltage and the negative polarity gray scale voltage outputted from the second gray scale voltage adjustment section; and resistors respectively corresponding to intersections of (I) the transmission lines each connecting the first input terminal and the second input terminal and (II) signal lines respectively connected to the video lines.

According to the foregoing configuration, the positive polarity gray scale voltage and the negative polarity gray scale voltage outputted from the first gray scale voltage adjustment section are inputted to the DA conversion circuit via one input terminal (first input section) and the positive polarity gray scale voltage and the negative polarity gray scale voltage outputted from the second gray scale voltage adjustment section are inputted to the DA conversion circuit via another input terminal (second input section), and the DA conversion circuit includes resistors respectively corresponding to intersections of (I) the transmission lines each connecting the first input terminal and the second input terminal and (II) signal lines respectively connected to the video lines. Thus, a certain gray scale voltage VHX can be easily inclined between VHXa generated by the first gray scale voltage adjustment section and VHXb generated by the second gray scale voltage adjustment section. Therefore, an output voltage of the liquid crystal driving circuit can be easily inclined.

Further, it is preferable to configure the liquid crystal display apparatus driving circuit of the present invention so that the first gray scale voltage adjustment section and the second grayscale voltage adjustment section adjust the center potential of the positive polarity gray scale voltage and the center potential of the negative polarity gray scale voltage in accordance with inclination of a charge pull-in amount $\Delta V$ in the display section.

According to the foregoing arrangement, each of the first gray scale voltage adjustment section and the second gray scale voltage adjustment section adjust each of the center potentials in accordance with the inclination of the charge pull-in amount $\Delta V$ in the display section. Thus, it is possible to more optimally reduce the flicker phenomenon originally caused by the charge pull-in amounts $\Delta V$ in the display screen of the liquid crystal panel.

Further, it is preferable to configure the liquid crystal display apparatus driving circuit of the present invention so that the first gray scale voltage adjustment section includes a first adjustment voltage generation circuit for generating a first output adjustment voltage by using a first gray scale voltage adjustment signal supplied from the outside, and the second gray scale voltage adjustment section includes a second adjustment voltage generation circuit for generating a second output adjustment voltage by using a second gray scale voltage adjustment signal supplied from the outside.

Further, it is preferable to configure the liquid crystal display apparatus driving circuit of the present invention so that each of the driving sections is arranged so that one of the first gray scale voltage adjustment section and the second gray scale voltage adjustment section includes a third adjustment voltage generation circuit for generating a third output adjustment voltage by using a third gray scale voltage adjustment signal supplied from the outside, and the other of the first gray scale voltage adjustment section and the second gray scale voltage adjustment section receives a fourth output adjustment voltage generated by an adjacent driving section.

According to the foregoing configuration, each driving section has only to include a single adjustment voltage generation circuit and obtains the third output adjustment voltage from the adjacent driving section. Thus, it is possible to reduce the cost, and the gray scale voltage adjustment signal has only to be inputted to only one of the first gray scale voltage adjustment section and the second gray scale voltage adjustment section, so that it is possible to reduce an amount of prepared data (i.e., amount of data of the gray scale voltage adjustment signal).

Further, it is preferable to configure the liquid crystal display apparatus driving circuit of the present invention so that the first adjustment voltage generation circuit and the second adjustment voltage generation circuit are provided for every arbitrarily predesignated number of gray scales, and adjust the center potentials for every arbitrarily predesignated number of gray scales.

Further, it is preferable to configure the liquid crystal display apparatus driving circuit of the present invention so that the third adjustment voltage generation circuit is provided for every arbitrarily predesignated number of gray scales, and adjusts the center potentials for every arbitrarily predesignated number of gray scales.

Further, it is preferable to configure the liquid crystal display apparatus driving circuit of the present invention so that the first adjustment voltage generation circuit includes: a variable resistor element whose resistance value is variable in accordance with a voltage value of the first gray scale voltage adjustment signal; and a buffer section for buffering an output from the variable resistor element.

Further, it is preferable to configure the liquid crystal display apparatus driving circuit of the present invention so that the second adjustment voltage generation circuit includes: a variable resistor element whose resistance value is variable in accordance with a voltage value of the second gray scale voltage adjustment signal; and a buffer section for buffering an output from the variable resistor element.

Further, it is preferable to configure the liquid crystal display apparatus driving circuit of the present invention so that the third adjustment voltage generation circuit includes: a variable resistor element whose resistance value is variable in accordance with a voltage value of the third gray scale voltage adjustment signal; and a buffer section for buffering an output from the variable resistor element.

Further, it is preferable to configure the liquid crystal display apparatus driving circuit of the present invention so that the variable resistor element is a potentiometer.

Further, it is preferable to configure the liquid crystal display apparatus driving circuit of the present invention so that the gray scale voltage generation circuit includes: a first voltage division circuit for generating a plurality of positive and negative reference voltages from positive and negative standard voltages; second and third voltage division circuits each of which generates a positive polarity gray scale voltage from a positive polarity reference voltage; and fourth and fifth voltage division circuits each of which generates a negative polarity gray scale voltage from a negative polarity reference voltage, and the first gray scale voltage adjustment section outputs, to one of the second voltage division circuit and the third voltage division circuit and one of the fourth voltage division circuit and the fifth voltage division circuit, (i) a voltage obtained by increasing each of the reference voltages of the first voltage division circuit so that an increment is equal to an output adjustment voltage or (ii) a voltage corresponding to said voltage obtained, and the second gray scale voltage adjustment section outputs, to the other of the second voltage division circuit and the third voltage division circuit and the other of the fourth voltage division circuit and the fifth voltage division circuit, (a) another voltage obtained by increasing each of the reference voltages of the first voltage division circuit so that an increment is equal to another output adjustment voltage or (b) a voltage corresponding to said another voltage obtained.

Further, it is preferable that a liquid crystal display apparatus of the present invention comprises: any one of the aforementioned liquid crystal display apparatus driving circuits; a control section for controlling the liquid crystal display apparatus driving circuit; and a display panel.

Further, it is preferable to configure the liquid crystal display apparatus driving circuit of the present invention so that each of the driving sections is a source driver.

Further, it is preferable that a liquid crystal display apparatus source driver is provided as each of the driving sections on any one of the aforementioned liquid crystal display apparatus driving circuits.

Further, it is preferable that a liquid crystal display apparatus controller of the present invention comprises a control section for controlling any one of the aforementioned liquid crystal display apparatus driving circuits.

For a fuller understanding of the nature and advantages of the invention, reference should be made to the ensuing detailed description taken in conjunction with the accompanying drawings.

REFERENCE SIGNS LIST

Figure 1:
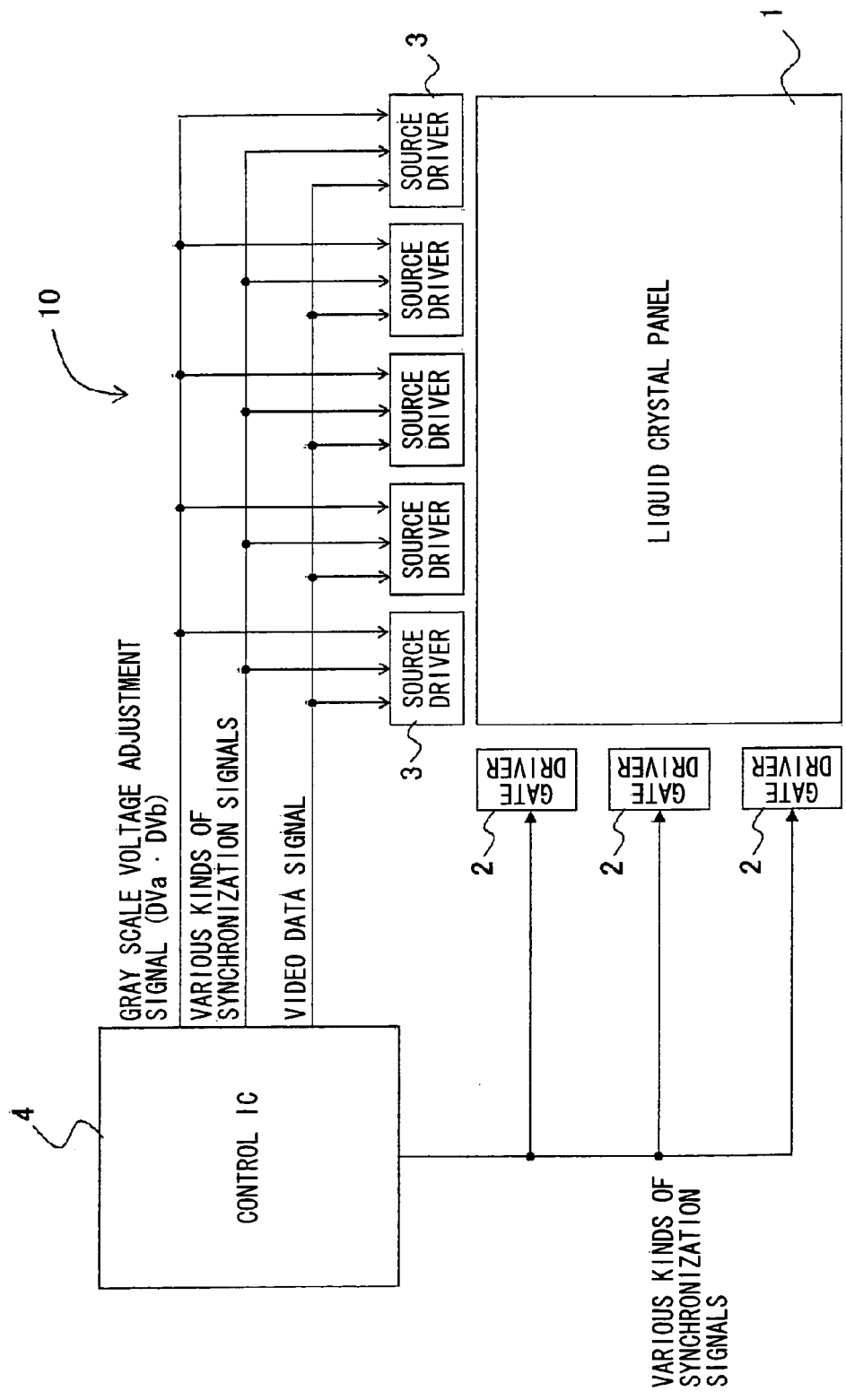
FIG. 1, showing an embodiment of the present invention, is a block diagram illustrating an example of a configuration of a liquid crystal display apparatus.

3 Source driver (driving section)
4 Control IC (control section)

36 Gray scale voltage generation circuit
36a Gray scale voltage generation circuit
37 DA conversion circuit
40a First adjustment voltage generation circuit
40b Second adjustment voltage generation circuit
364m Variable resistor
364n Buffer (buffer section)
361 First voltage divider circuit
362a Second voltage divider circuit
362b Fourth voltage divider circuit
362c Third voltage divider circuit
362d Fifth voltage divider circuit

DESCRIPTION OF EMBODIMENTS

Embodiment 1

Flicker Phenomenon

A liquid crystal display apparatus of an embodiment of the present invention includes driving sections (source drivers) each of which aims to solve a flicker phenomenon. First, the following describes the flicker phenomenon before describing the present embodiment.

The flicker is caused by the following two factors.

The first factor is as follows. Due to a round waveform of a gate driving signal in a TFT liquid crystal panel, charge pull-in amounts $\Delta V$ respectively caused by parasitic capacitances Cgd of pixels of a TFT liquid crystal substrate are different from each other.

The second factor is as follows. In the step of forming a pixel pattern on the TFT liquid crystal substrate, an area size of the TFT liquid crystal substrate may be so large that it is difficult to form the pixel pattern on the entire surface of the TFT liquid crystal substrate by a single forming process, so that the forming process of the pixel pattern is performed plural times with respect to plural blocks into which the surface of the TFT liquid crystal substrate is divided. In this case, due to an alignment position or a property of a pattern forming device, the charge pull-in amounts $\Delta V$ respectively caused by the parasitic capacitances Cgd of the pixels of the TFT liquid crystal substrate are different from each other.

In the liquid crystal display apparatus, for example, a voltage VLCX added to a liquid crystal layer of each pixel at the time of X gray scale display is represented by the following equations where Vcom is a counter potential and VHX is a positive polarity gray scale voltage in the X-th gray scale.

$$VLCX = VHX - Vcom \text{ (at the time of positive polarity driving)} \quad (1)$$

$$VLCX = Vcom - VLX \text{ (at the time of negative polarity driving)} \quad (2)$$

However, the charge pull-in amount $\Delta V$ caused by the parasitic capacitance Cgd exists in the TFT liquid crystal substrate as described above, so that the voltage VLCX actually added to the liquid crystal layer is represented by the following equations.

$$VLCX = (VHX - \Delta V) - Vcom \text{ (at the time of positive polarity driving)} \quad (3)$$

$$VLCX = Vcom - (VLX - \Delta V) \text{ (at the time of negative polarity driving)} \quad (4)$$

That is, VHX and VLX decrease by $\Delta V$, so that the voltage applied to the liquid crystal layer at the time of positive polarity driving (this voltage is referred to also as "positive polarity voltage") and the voltage applied to the liquid crystal layer at the time of negative polarity driving (this voltage is referred to also as "negative polarity voltage") are unbalanced, and deviation occurs in center values of the voltage applied to the liquid crystal layer at the time of positive polarity driving and the voltage applied to the liquid crystal layer at the time of negative polarity driving. This results in the flicker phenomenon.

If VLCX changes as represented by the equations (3) and (4), a light transmission of the liquid crystal layer changes. Accordingly, a gray scale level different from a desired gray scale level is displayed in the liquid crystal display apparatus, so that a gray scale property (γ curve) changes.

On the other hand, it is possible to reduce the flicker phenomenon by adjusting, in accordance with the deviation of the charge pull-in amounts ΔV in the panel screen, a gray scale voltage applied to the liquid crystal layer. However, the change in the gray scale voltage is associated with not only the degree of the flicker phenomenon caused by the unevenness of the center values of the positive polarity voltage and the negative polarity voltage in the gray scales but also display quality in a change or the like of the gray scale property, i.e., a change of so-called γ value. Thus, a structure which can reduce the flicker phenomenon without changing the gray scale property (γ curve) is desired. That is, in order not to change the gray scale property (γ curve), there is desired a configuration in which VLCX in each gray scale level is fixed to a desired value to reduce the flicker phenomenon.

(Configuration of Liquid Crystal Display Apparatus)

FIG. 1 is a block diagram illustrating an example of a configuration of the liquid crystal display apparatus of the present embodiment.

In FIG. 1, the liquid crystal display apparatus 10 includes: a liquid crystal panel 1; a plurality of gate drivers 2; a plurality of source drivers ("driving section" recited in claims) 3; and a control IC (control section) 4 for outputting a video data signal and a control signal for controlling these sections.

In the liquid crystal panel 1, a plurality of scanning signal lines (gate signal lines) and a plurality of video signal lines (source signal lines) intersect with each other, and a plurality of display pixels, connected to the gate signal lines and the source signal lines, are provided in a matrix manner, so as to respectively correspond to pixel regions (pixels) sectioned by both the signal lines.

The gate drivers 2 are provided on a periphery of the liquid crystal panel 1 so that each gate driver 2 corresponds to a plurality of (a predetermined number of) the gate signal lines, and a scanning signal (gate signal) for selectively driving each pixel connected to each gate signal line is selectively supplied to a corresponding gate signal line.

The source drivers 3 are provided on the periphery of the liquid crystal panel 1 so that each source driver 3 corresponds to a plurality of (a predetermined number of) the source signal lines, and each of the positive polarity gray scale voltage and the negative polarity gray scale voltages which corresponds to a video display of each display pixel connected to each source signal line is selectively supplied to a corresponding source signal line as a video signal (source signal).

The control IC4 supplies, to the gate drivers 2, various kinds of signals such as a clock signal CK and a start pulse SP, and the control IC3 supplies, to the source drivers 3, various kinds of signals such as a clock signal CK, a start pulse SP, and a latch signal LS, and video data signals DR, DG, and DB respectively indicative of R, G, B data, and a first gray scale voltage adjustment signal DVa and a second gray scale voltage adjustment signal DVb which respectively adjust gray scale voltages in respective gray scales.

That is, the liquid crystal display apparatus of the present embodiment has a function (gray scale voltage adjustment function) for adjusting gray scale voltages in respective gray scales in accordance with the first gray scale voltage adjustment signal DVa and the second gray scale voltage adjustment signal DVb which are inputted to the respective source drivers 3.

In the liquid crystal display apparatus 10, the source drivers 3 and the gate drivers 2 are driven by various kinds of synchronization signals outputted from the control IC4, so that a video based on the video data signal is displayed in the liquid crystal panel 1 constituting the display section.

Particularly, it should be noted that the gray scale voltage adjustment signals DVa and DVb are respectively supplied to the respective source drivers 3. The effect based on this will be described later.

(Configuration of Source Driver)

Figure 2:
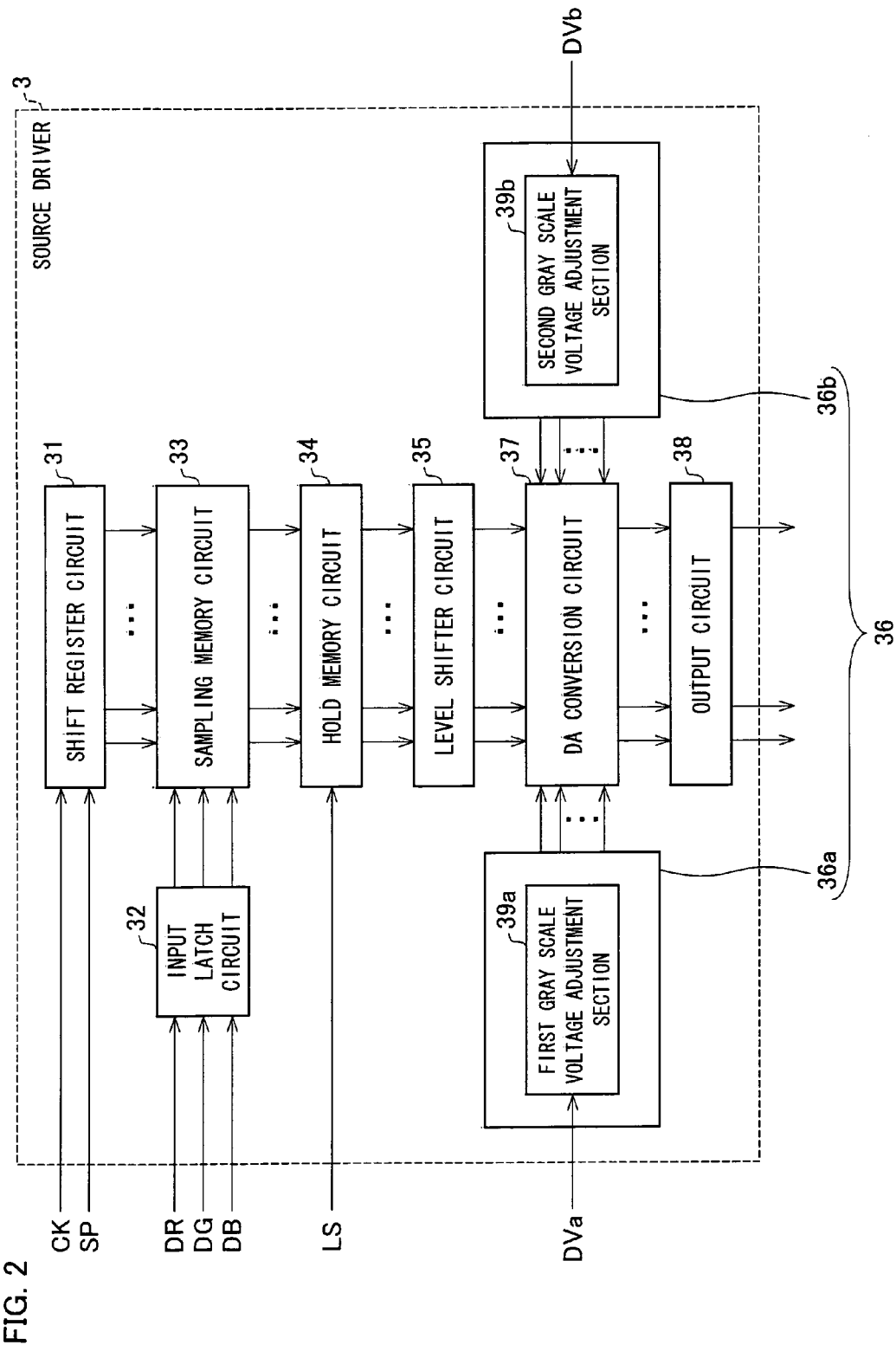
FIG. 2 is a block diagram illustrating an example of a configuration of a source driver of the liquid crystal display apparatus of FIG. 1.

FIG. 2 is a block diagram illustrating an example of a configuration of the source driver 3 of the liquid crystal display apparatus 10 of FIG. 1.

In FIG. 2, the source driver 3 includes a shift register circuit 31, an input latch circuit 32, a sampling memory circuit 33, a hold memory circuit 34, a level shifter circuit 35, a gray scale voltage generation circuit 36, a DA (digital/analog) conversion circuit 37, and an output circuit 38.

Note that, the source driver 3 of the present embodiment is characterized in the adjustment voltage generation circuit 36, the DA conversion circuit 37, and the first gray scale voltage adjustment signal DVa and the second gray scale voltage adjustment signal DVb which are inputted to the adjustment voltage generation circuit 36.

The shift register circuit 31 receives the clock signal CK and the start pulse SP from the control IC4 and generates a sampling clock for each source signal line so as to supply the sampling clock to the sampling memory circuit 33.

The input latch circuit 32 latches the video data signals DR, DG, and DB which are supplied from the control IC4.

The sampling memory circuit 33 samples the video data signals DR, DG, and DB, having been latched by the input latch circuit 32, at a timing of a sampling clock supplied from the shift register circuit 31.

The hold memory circuit 34 latches and holds the video data signals (sampling data) of a single horizontal line, outputted from the sampling memory 33. The hold memory circuit 34 latches the video data signals at a timing indicated by the latch signal LS supplied from the control IC4.

The level shifter circuit 35 receives the video data signals (sampling data) of the hold memory circuit 34, and shifts a level thereof by a predetermined amount.

The gray scale voltage generation circuit 36 includes a first gray scale voltage generation circuit 36a and a second gray scale voltage generation circuit 36b, and each of the first and second gray scale voltage generation circuits 36a and 36b can generate a plurality of gray scale voltages required in multi-stage display, and the first gray scale voltage generation circuit 36a generates a first standard gray scale voltage group (VH0a to VH63a, VL0a to VL63a), and the second gray scale voltage generation circuit 36b generates a second standard gray scale voltage group (VH0b to VH63b, VL0b to VL63b).

The first standard gray scale voltage group (VH0a to VH63b, VL0a to VL63a) is inputted from one end of the DA conversion circuit 37, and the second standard gray scale voltage group (VH0b to VH63b, VL0b to VL63b) is inputted from the other end of the DA conversion circuit 37.

The first gray scale voltage generation circuit 36a includes a first gray scale voltage generation section 39a which generates a first adjustment voltage Va in accordance with a first gray scale voltage adjustment signal DVa supplied from the control IC4 and adjusts a gray scale voltage in each gray scale in accordance with the first adjustment voltage Va.

Meanwhile, the second gray scale voltage generation circuit 36*b* includes a second gray scale voltage generation section 39*b* which generates a second adjustment voltage Vb in accordance with a second gray scale voltage adjustment signal DVb supplied from the control IC4 and adjusts a gray scale voltage in each gray scale in accordance with the second adjustment voltage Vb.

Each of the first adjustment voltage Va and the second adjustment voltage Vb is used to increase a gray scale voltage in each gray scale (a positive polarity gray scale voltage VHX in an X-th gray scale and a negative gray scale voltage VLX in the X-th gray scale) so that an increment is equal to the charge pull-in amount ΔV.

The DA conversion circuit 37 performs DA conversion with respect to the gray scale voltage from the gray scale voltage generation circuit 36 in accordance with a video data signal from the level shifter circuit 35 and supplies the converted gray scale voltage to the output circuit 38.

Figure 3:
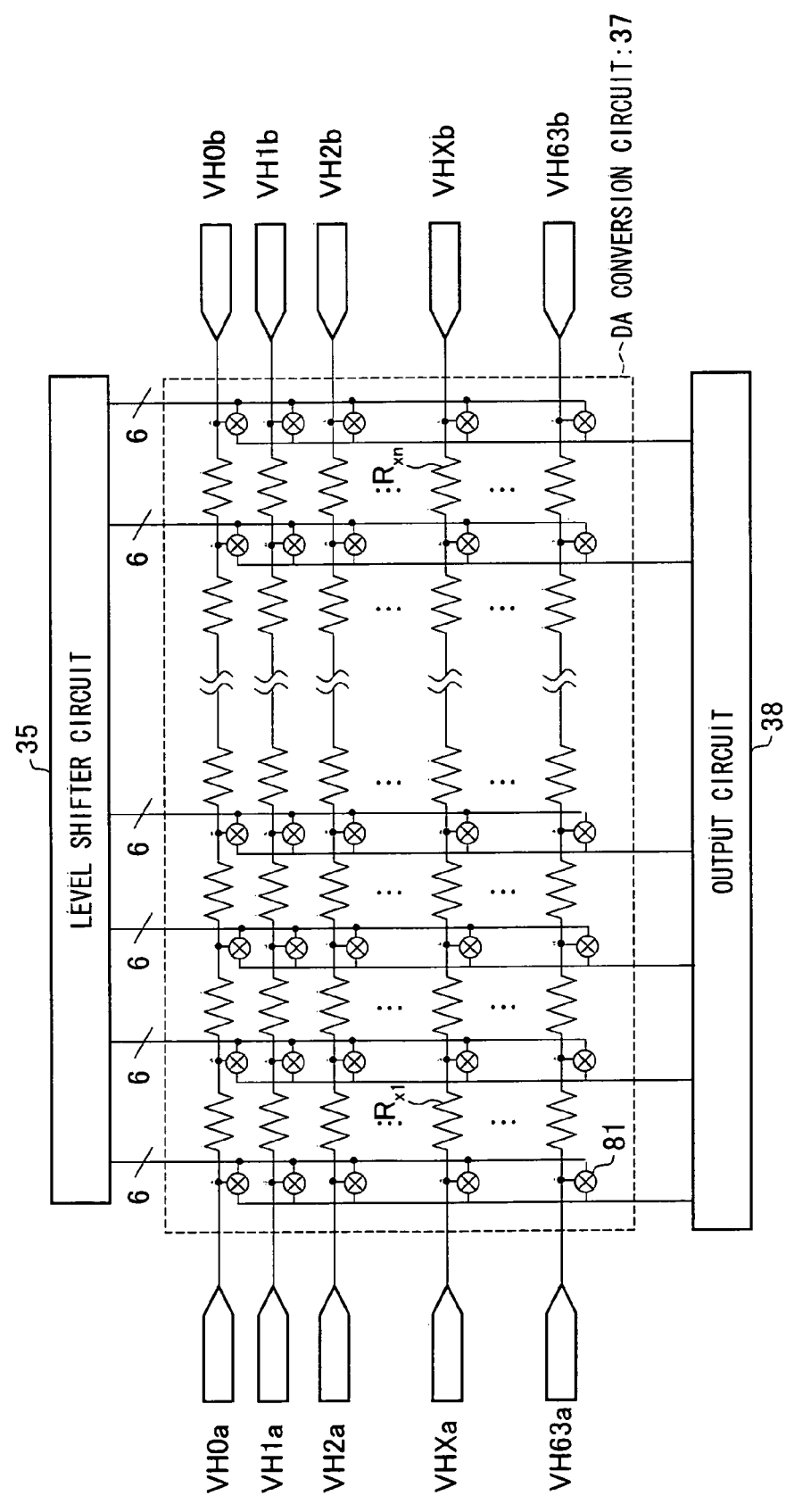
FIG. 3 is a conceptual diagram illustrating a DA conversion circuit of FIG. 2.

FIG. 3 is a conceptual diagram illustrating the DA conversion circuit 37. As illustrated in FIG. 3, the DA conversion circuit 37 includes: input terminals respectively receiving gray scale voltages of the first standard gray scale voltage group and input terminals for respectively receiving gray scale voltages of the second standard gray scale voltage group; 64×n number of resistors (Rx1 to Rxn) each of which is provided on a gray scale standard voltage transmission line between these input terminals so as to correspond to each of the source signal lines; and switching circuits 81 provided so as to respectively correspond to the resistors.

Thus, in case where the number of the source signal lines is n, it is possible to output a voltage whose inclination depends on a resistance ratio of RX1 to RXn of FIG. 3 by inputting the standard gray scale voltages VHXa and VHXb, different from each other, from both sides of the DA conversion circuit 37. That is, the DA conversion circuit 37 of the present embodiment makes it possible to obtain a voltage output which inclines in a direction of output terminals of the source drivers 3.

The configuration of the DA conversion circuit 37 of the present embodiment is further detailed though the description again. The DA conversion circuit 37 of the present embodiment has the following two characteristics.

(i) The first standard gray scale voltage group (VH0*a* to VH63*a*, VL0 to VL63*a*) and the second standard gray scale voltage group (VH0*b* to VH63*b*, VL0*b* to VL63*b*) can be respectively inputted from both ends or any two points (first input terminal, second input terminal) of the DA conversion circuit 37.

(ii) Between selector circuits (switching circuits 82) adjacent to each other in the DA conversion circuit 37, resistors RXn are provided so that the number of the resistors RXn is equal to (standard gray scale voltage)×(the number of the source driver output terminals).

By giving the (i) and (ii) characteristics to the DA conversion circuit 37, it is possible to incline outputs of source driver output terminals between VH0*a* and VH0*b* on the basis of resistances (bleeder resistances) R01 to R0*n*. That is, it is possible to inline the source driver output voltages by adjusting the first standard gray scale voltage group (VH0*a* to VH63*a*, VL0*a* to VL63*a*) and the second standard gray scale voltage group (VH0*b* to VH63*b*, VL0*b* to VL63*b*).

Figure 4:
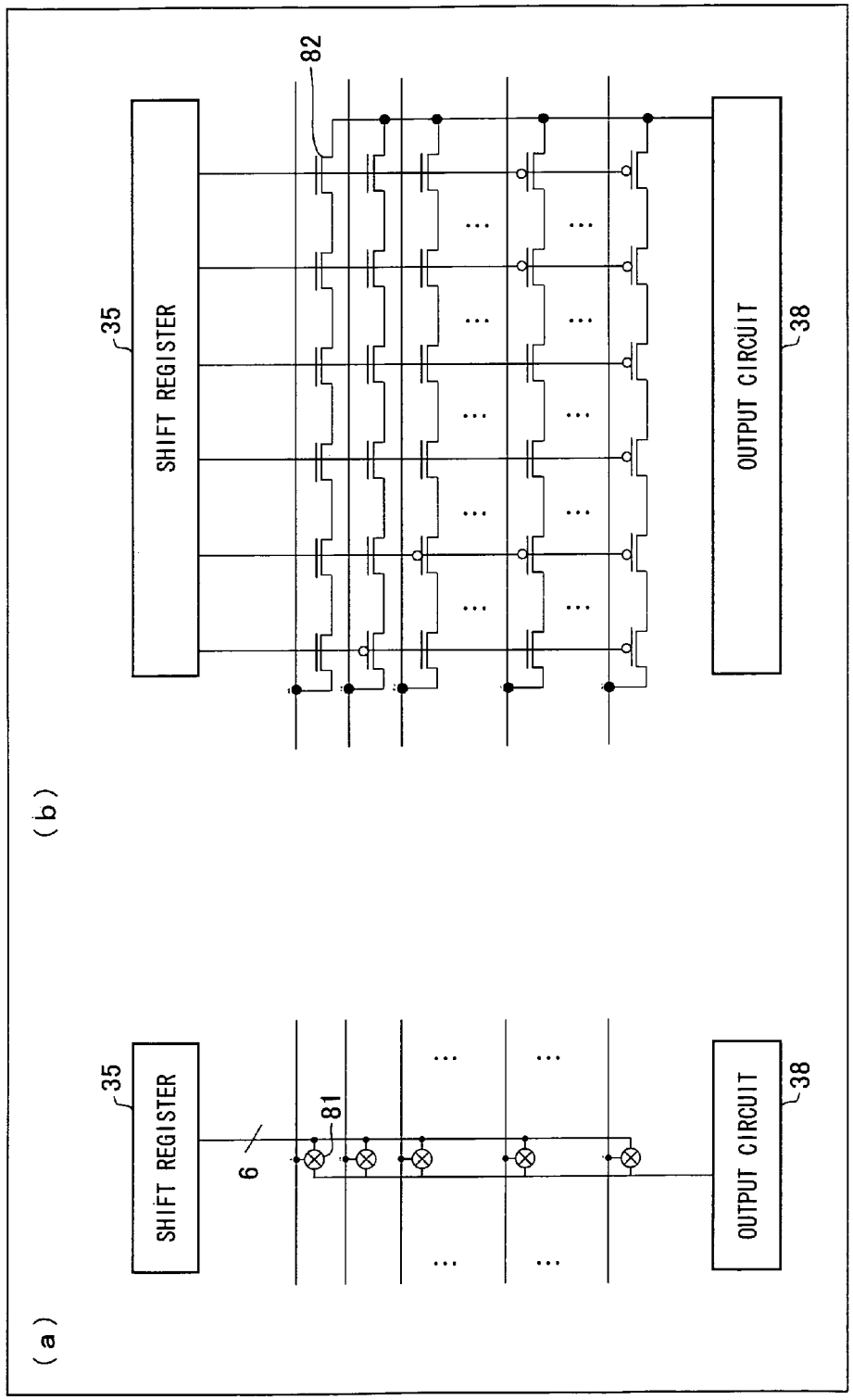
FIG. 4 is a diagram illustrating part of the DA conversion circuit of FIG. 3, and (a) is a conceptual diagram illustrating part of the DA conversion circuit of FIG. 3, and (b) is a circuit diagram detailing a circuit equivalent to the circuit of (a).

For convenience, FIG. 3, like (a) of FIG. 4, conceptually illustrates analog switches (switch circuits) 81 as selector circuits for selecting an analog voltage from image data. Note that, for convenience, illustration of the resistor is omitted in (a) of FIG. 4.

(b) of FIG. 4 is a detail circuit diagram equivalent to the illustration of the analog switch (switching circuit) 81 of (a) of FIG. 4. Based on digital data (8 bits as an example in (b) of FIG. 4) inputted from the level shifter circuit 35, switching elements 82 are provided in the selector circuits so that the number of the switching elements 82 is equal to the number obtained by multiplying the number of bits of the digital data by the standard gray scale voltage. This structure allows an analog voltage based on the inputted image data to be outputted.

Figure 5:
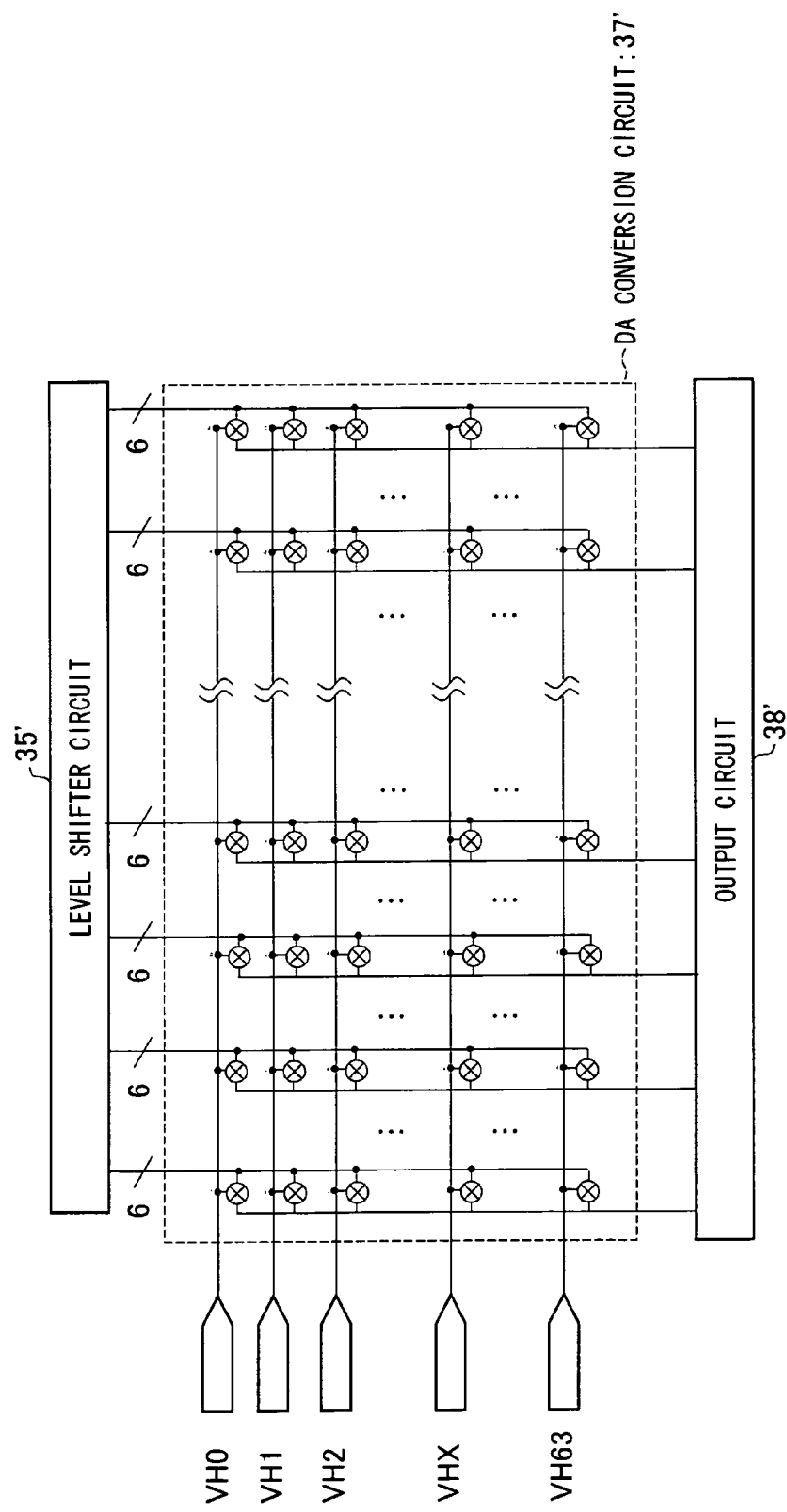
FIG. 5 is a conceptual diagram illustrating a conventional and general DA conversion circuit.

FIG. 5 is a circuit diagram illustrating a general DA conversion circuit 37' as a referential example of the DA conversion circuit 37 of the present embodiment. As illustrated in FIG. 5, the general DA conversion circuit 37' includes only one input terminal for receiving the standard gray scale voltage group (VH0 to VH63) and includes no resistors unlike the present embodiment. Thus, each standard gray scale voltage group (VH0 to VH63) has a constant value in the DA conversion circuit', so that it is impossible to output an analog voltage inclined in a direction of the source driver output terminal.

The output circuit 38 outputs the DA-converted gray scale voltages, supplied from the DA conversion circuit 37, to the respective source signal lines as display voltages.

(Configuration of Gray Scale Voltage Generation Circuit)

Figure 6:
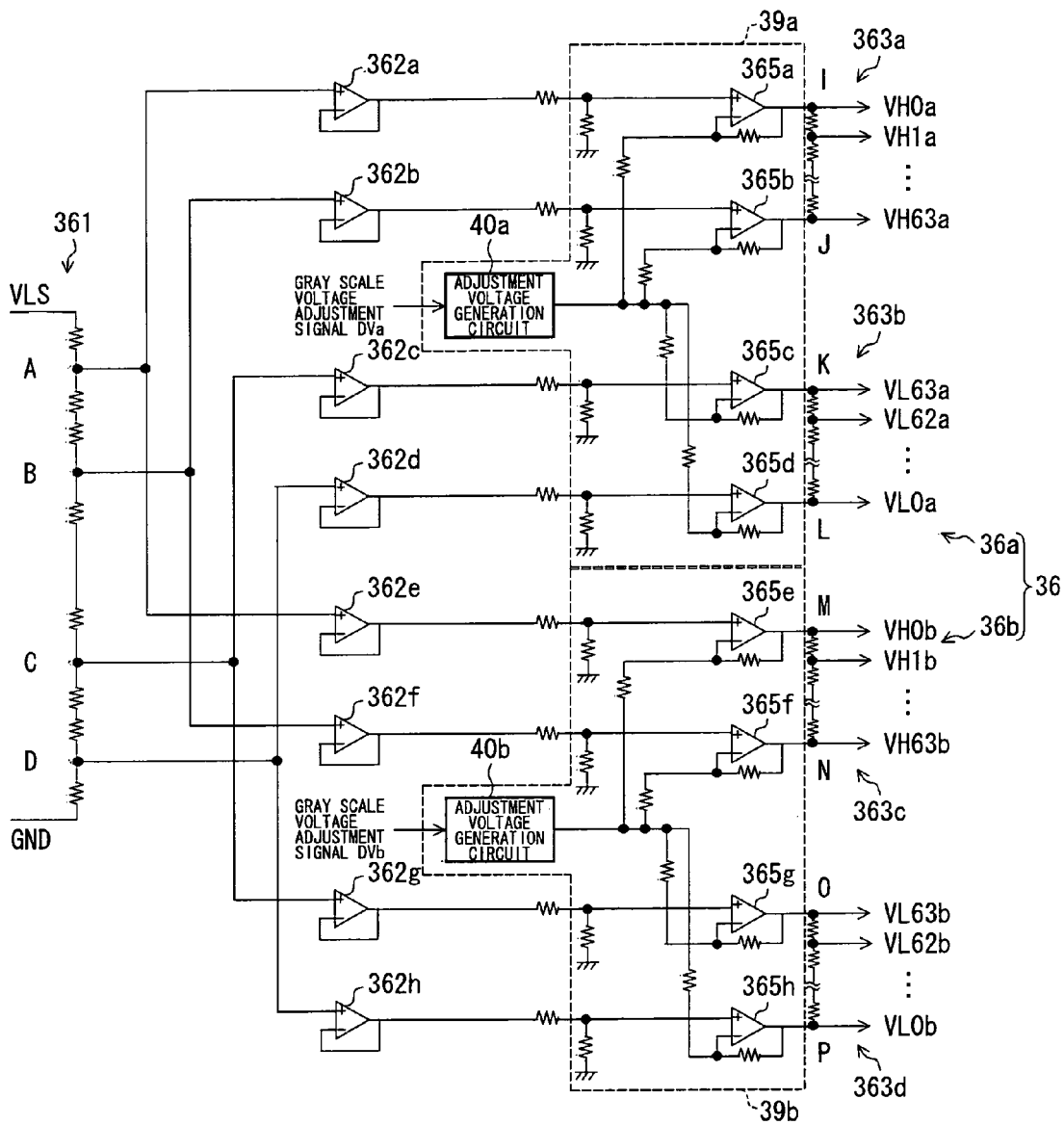
FIG. 6 is a circuit diagram illustrating an example of a configuration of a gray scale voltage generation circuit of the source driver of FIG. 2.

FIG. 6 is a circuit diagram schematically illustrating a configuration of the gray scale voltage generation circuit 36. As described above, the gray scale voltage generation circuit includes the first gray scale voltage generation circuit 36*a* and the second gray scale voltage generation circuit 36*b* as illustrated in FIG. 6, and the first gray scale voltage generation circuit 36*a* generates the first standard gray scale voltage group (VH0*a* to VH63*a*, VL0*a* to V63*a*) and the second gray scale voltage generation circuit 36*b* generates the second standard gray scale voltage group (VH0*b* to VH63*b*, VL0*b* to V63*b*).

The gray scale voltage generation circuit 36 includes: a first voltage divider circuit 361 for generating positive and negative standard voltages VLS and positive and negative plural reference voltages (resistance division voltages of points A to D); buffers 362*a* and 362*e* for temporarily storing the resistance division voltage of the point A; buffers 362*b* and 362*f* for temporarily storing the resistance division voltage of the point B; buffers 362*c* and 362*g* for temporarily storing the resistance division voltage of the point C; buffers 362*d* and 362*h* for temporarily storing the resistance division voltage of the point D; a second voltage divider circuit 363*a* for generating the first standard gray scale voltage group (VH0*a* to VH63*a*) through resistance division by using the positive polarity reference voltages (resistance division voltages of the points A and B); a fourth voltage divider circuit 363*b* for generating the first standard gray scale voltage group (VL63*a* to VL0*a*) through resistance division by using the negative polarity reference voltages (resistance division voltages of the points C and D); a third voltage divider circuit 363*c* for generating the positive polarity second standard gray scale voltage (VH0*b* to VH63*b*) through resistance division by using positive polarity reference marks (resistance division voltages of the points A and B); a fifth voltage divider circuit 363*d* for generating the negative polarity second standard gray scale voltage (VL63*b* to VL0*b*) through resistance division by using negative polarity reference marks (resistance division voltages of the points C and D); a first gray scale voltage adjustment section 39*a* for outputting the first adjustment voltage Va corresponding to the charge pull-in amount ΔV caused by the parasitic capacitance Cgd so as to add the first adjustment voltage Va to each of the reference voltages (resistance division voltages of the points A to D); and a second gray scale voltage adjustment section 39b outputting the second adjustment voltage Vb corresponding to the charge pull-in amount ΔV caused by the parasitic capacitance Cgd so as to add the second adjustment voltage Vb to each of the reference voltages (resistance division voltages of the points A to D).

Note that, the second voltage divider circuit 363a and the fourth voltage divider circuit 363b are provided on the side of the output of the first gray scale voltage adjustment section 39a, and the third voltage divider circuit 363c and the fifth voltage divider circuit 363d are provided on the side of the output of the second gray scale voltage adjustment section 39b.

Positive polarity input terminals of the buffers 362a and 362e are connected to the point A of the first voltage divider circuit 361, and negative polarity input terminals of the buffers 362a and 362e are connected to an output terminal thereof. Positive reference voltages are outputted from the buffers 362a, 362e, 362b, and 362f.

Further, positive polarity input terminals of the buffers 362c and 362g are connected to the point C of the first voltage divider circuit 361, and negative polarity input terminals of the buffers 362c and 362g are connected to the output terminals thereof. Positive polarity input terminals of the buffers 362d and 362h are connected to the point D of the first voltage divider circuit 361, and negative polarity input terminals of the buffers 362d and 362h are connected to the output terminals thereof.

Further, the first gray scale voltage adjustment section 39a is provided as the subsequent stage of the buffers 362a to 362d via the resistors. Further, the second gray scale voltage adjustment section 39b is provided as the subsequent stage of the buffers 362e to 362h via the resistors.

(Configuration of Gray Scale Voltage Adjustment Section)

The first gray scale voltage adjustment section 39a includes: a first gray scale voltage generation circuit 40a for generating the first gray scale voltage Va in accordance with the first gray scale voltage adjustment signal DVa supplied from the control IC4; differential amplification circuits 365a to 365d, wherein the first adjustment voltage Va is added to each of the reference voltages from the output terminals of the buffers 362a to 362d and the resultant voltage is inputted to each of the negative polarity input terminals of the differential amplification circuits 365a to 365d. The first adjustment voltage Va is used to increase the reference voltage so that the increment is equal to the charge pull-in amount ΔV caused by the parasitic capacitance Cgd.

Meanwhile, the second gray scale voltage adjustment section 39b includes: a second gray scale voltage generation circuit 40b for generating the second gray scale voltage Vb in accordance with the second gray scale voltage adjustment signal DVb supplied from the control IC4; differential amplification circuits 365e to 365h, wherein the second adjustment voltage Vb is added to each of the reference voltages from the output terminals of the buffers 362e to 362h and the resultant voltage is inputted to each of the negative polarity input terminals of the differential amplification circuits 365e to 365h. The second adjustment voltage Vb is used to increase the reference voltage so that the increment is equal to the charge pull-in amount ΔV caused by the parasitic capacitance Cgd.

(Configuration of Adjustment Voltage Generation Circuit)

Figure 7:
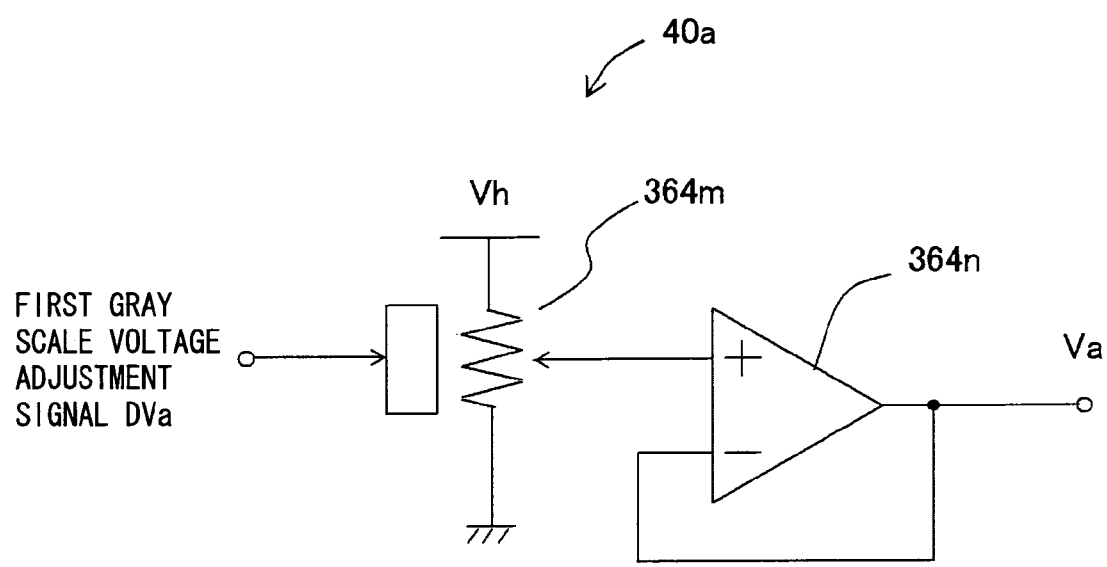
FIG. 7 is a circuit diagram illustrating an example of a configuration of the gray scale voltage generation circuit of FIG. 6.

FIG. 7 is a circuit diagram schematically illustrating a configuration of the first adjustment voltage generation circuit 40a. Note that, the first adjustment voltage generation circuit 40a is different from the second adjustment voltage generation circuit 40b only in an inputted signal and an outputted signal and their internal circuit configurations are the same, so that description of the configuration of the second adjustment voltage generation circuit 40b is omitted here.

As illustrated in FIG. 7, the first adjustment voltage generation circuit 40a includes: a variable resistor 364m whose resistance value is variable in accordance with the first gray scale voltage adjustment signal DVa; and a buffer 364n serving as a buffer section whose positive polarity input terminal is connected to an output of the variable resistor 364m and whose negative polarity input terminal is connected to an output terminal thereof so as to output the gray scale voltage Va.

That is, the first gray scale voltage generation circuit 40a is a circuit for selectively outputting voltages Vh to 0V in accordance with the first gray scale voltage adjustment signal DVa. As the variable resistor 364m, it is preferable to use a potentiometer or the like to which serial data is inputted to obtain a desired resistance value. The following describes a case where the potentiometer is used as the variable resistor 364m.

(Configuration of Differential Amplifier)

With reference to FIG. 6 again, the internal configuration of the first gray scale voltage adjustment section 39a is further detailed.

A positive polarity input terminal of the differential amplification circuit 365a is connected to a junction between an output terminal of the buffer 362a connected via a resistor and other terminal whose end is grounded, and a negative polarity input terminal of the differential amplification circuit 365a is connected to an output terminal of the first adjustment voltage generation circuit 40a via a resistor.

A positive polarity input terminal of the differential amplification circuit 365b is connected to a junction between an output terminal of the buffer 362b connected via a resistor and other terminal whose end is grounded, and a negative polarity input terminal of the differential amplification circuit 365b is connected to the output terminal of the first adjustment voltage generation circuit 40a via a resistor.

A positive polarity input terminal of the differential amplification circuit 365c is connected to a junction between an output terminal of the buffer 362c connected via a resistor and other terminal whose end is grounded, and a negative polarity input terminal of the differential amplification circuit 365c is connected to the output terminal of the first adjustment voltage generation circuit 40a via a resistor.

A positive polarity input terminal of the differential amplification circuit 365d is connected to a junction between an output terminal of the buffer 362d connected via a resistor and other terminal whose end is grounded, and a negative polarity input terminal of the differential amplification circuit 365d is connected to the output terminal of the first adjustment voltage generation circuit 40a via a resistor.

A positive polarity input terminal of the differential amplification circuit 365e is connected to a junction between an output terminal of the buffer 362e connected via a resistor and other terminal whose end is grounded, and a negative polarity input terminal of the differential amplification circuit 365e is connected to an output terminal of the second adjustment voltage generation circuit 40b via a resistor.

A positive polarity input terminal of the differential amplification circuit 365f is connected to a junction between an output terminal of the buffer 362f connected via a resistor and other terminal whose end is grounded, and a negative polarity input terminal of the differential amplification circuit 365f is connected to the output terminal of the second adjustment voltage generation circuit 40b via a resistor.

A positive polarity input terminal of the differential amplification circuit 365g is connected to a junction between an output terminal of the buffer 362g connected via a resistor and other terminal whose end is grounded, and a negative polarity input terminal of the differential amplification circuit 365g is connected to the output terminal of the second adjustment voltage generation circuit 40b via a resistor.

A positive polarity input terminal of the differential amplification circuit 365h is connected to a junction between an output terminal of the buffer 362h connected via a resistor and other terminal whose end is grounded, and a negative polarity input terminal of the differential amplification circuit 365h is connected to the output terminal of the second adjustment voltage generation circuit 40b via a resistor.

Further, an output terminal of the differential amplification circuit 365a is connected to a point I provided on the second voltage divider circuit 363a for outputting a positive polarity maximum gray scale voltage VH0a with respect to the counter voltage Vcom, and an output terminal of the differential amplification circuit 365b is connected to a point J provided on the second voltage divider circuit 363a for outputting a positive polarity minimum gray scale voltage VH63a.

Further, an output terminal of the differential amplification circuit 365c is connected to a point K provided on the fourth voltage divider circuit 363b for outputting a positive polarity maximum gray scale voltage VL63 with respect to the counter voltage Vcom, and an output terminal of the differential amplification circuit 365d is connected to a point L provided on the fourth voltage divider circuit 363b for outputting a positive polarity minimum gray scale voltage VL0.

Further, an output terminal of the differential amplification circuit 365e is connected to a point M provided on the third voltage divider circuit 363c for outputting a positive polarity maximum gray scale voltage VH0b with respect to the counter voltage Vcom, and an output terminal of the differential amplification circuit 365f is connected to a point N provided on the third voltage divider circuit 363c for outputting a positive polarity minimum gray scale voltage VH63a.

Further, an output terminal of the differential amplification circuit 365g is connected to a point O provided on the fifth voltage divider circuit 363d for outputting a positive polarity maximum gray scale voltage VL63 with respect to the counter voltage Vcom, and an output terminal of the differential amplification circuit 365h is connected to a point P provided on the fifth voltage divider circuit 363d for outputting a positive polarity minimum gray scale voltage VL0.

Thus, out of gray scale voltages having positive polarities with respect to the counter voltage Vcom, a gray scale voltage VH0a whose voltage value is maximum and a gray scale voltage VH63a whose voltage value is minimum are adjusted, and out of gray scale voltages having negative polarities with respect to the counter voltage Vcom, a gray scale voltage VL63a whose voltage value is maximum and a gray scale voltage VL0a whose voltage value is minimum are adjusted.

Further, out of gray scale voltages having positive polarities with respect to the counter voltage Vcom, a gray scale voltage VH0b whose voltage value is maximum and a gray scale voltage VH63b whose voltage value is minimum are adjusted, and out of gray scale voltages having negative polarities with respect to the counter voltage Vcom, a gray scale voltage VL63b whose voltage value is maximum and a gray scale voltage VL0b whose voltage value is minimum are adjusted.

In this manner, the first gray scale voltage adjustment section 39a shifts a minimum value (gray scale voltage VH63a), a maximum value (gray scale voltage VH0a) and a gray scale voltage range (VH63a to VH0a) so that the shift is equal to a voltage value (first adjustment voltage Va) for correcting deviation of the charge pull-in amounts ΔV in the screen. The gray scale voltage range includes the minimum value (VH63a) and the maximum value (VH0a) between which a positive gray scale voltage VHXa in an arbitrary X-th gray scale exists. The first gray scale voltage adjustment section 39a shifts a minimum value (gray scale voltage VL0a), a maximum value (gray scale voltage VL63a) and a gray scale voltage range (VL0a to VL63a) so that the shift is equal to the voltage value (first adjustment voltage Va) for correcting deviation of the charge pull-in amounts ΔV in the screen. The gray scale voltage range includes the minimum value (VL0a) and the maximum value (VL63a) between which a negative gray scale voltage VLXa in the arbitrary X-th gray scale exists. This makes it possible to change center potential of the positive polarity gray scale voltages and center potential of the negative polarity gray scale voltages, while maintaining a voltage difference of each gray scale between each of the positive polarity gray scale voltages and each of the negative gray scale voltages, so that the shift is equal to the voltage value (adjustment voltage Va) for correcting the deviation of the charge pull-in amounts ΔV in the screen. Note that, also an internal configuration of the second gray scale voltage adjustment section is the same as the internal configuration of the first gray scale voltage adjustment, so that description thereof is omitted here.

Further, the first standard gray scale voltage group (VH0a to VH63a, VL0a to V63a) generated by the first adjustment voltage generation circuit 36a is inputted from the left side of the DA conversion circuit 37, and the second standard gray scale voltage group (VH0b to VH63b, VL0b to V63b) generated by the second adjustment voltage generation circuit 36b is inputted from the right side of the DA conversion circuit 37.

(Operations of Adjustment Voltage Generation Circuit)

Next, operations of the first gray scale voltage generation circuit 36a of Embodiment 1 will be described as follows.

In the first adjustment voltage generation circuit 40a, a resistance value of the variable resistor 364m is controlled by the first gray scale voltage signal DVa, and the first adjustment voltage Va is outputted via the buffer 364n. In this manner, a voltage value ranging from Vh to 0V is selectively outputted as the first adjustment voltage Va from the first adjustment voltage generation circuit 40a in accordance with the first gray scale voltage adjustment signal DVa.

Accordingly, the differential amplification circuits 365a to 365d respectively output VH0a, VH63a, VL0a, and VL63, obtained by increasing gray scale voltages of the respective gray scales so that each increment is equal to the first adjustment voltage Va, from the first gray scale voltage generation circuit 36a.

Thus, VH0a, VH63a, VL0a, and VL63a are equally shifted higher so that each increment is equal to the first adjustment voltage Va supplied from the first gray scale voltage generation circuit 36a, so that it is possible to change only center potentials (hereinafter, referred to as "center values") of the positive polarity gray scale voltage and the negative polarity gray scale voltage while maintaining a voltage difference between the positive polarity gray scale voltage and the negative polarity gray scale voltage of each gray scale. For example, VH20a to VL20a are maintained at the same level as a level before the voltage adjustment, so that only the center values of VH20a and VL20a can be changed without changing the gray scale property.

Further, also in the second gray scale voltage generation circuit 36b, VH0b, VH63b, VL0b, and VL63b are equally shifted higher so that each increment is equal to the adjustment voltage Vb, so that it is possible to change only center potentials (hereinafter, referred to as "center values") of the positive polarity gray scale voltage and the negative gray scale voltage while maintaining the voltage difference between the positive polarity gray scale voltage and the negative polarity gray scale voltage of each gray scale.

Figure 8:
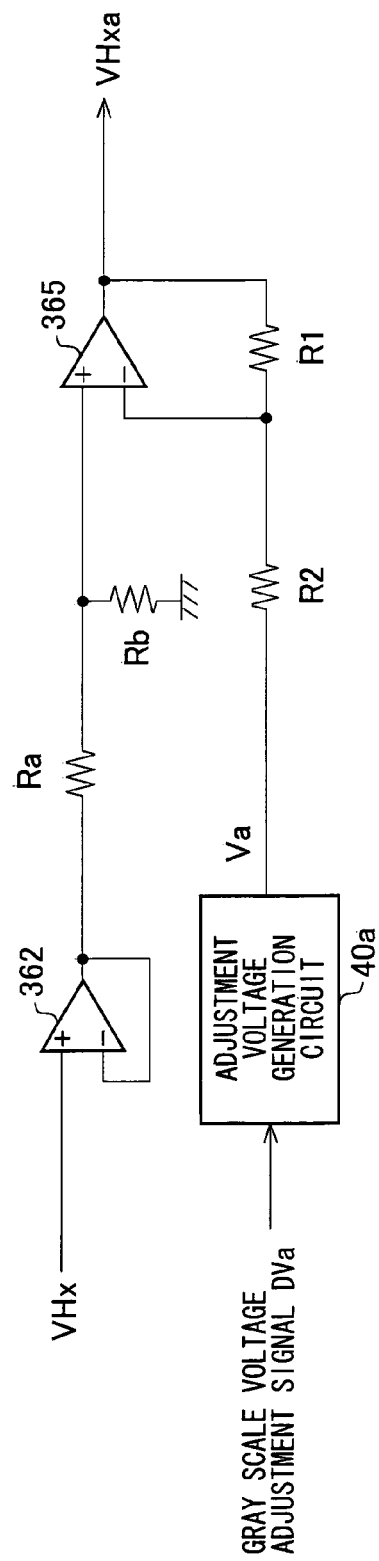
FIG. 8 is a circuit diagram illustrating part of the first gray scale voltage generation circuit 36a of FIG. 6.

Note that, with reference to FIG. 8, the following gives a supplementary explanation of an adjustment voltage value of a gray scale voltage. FIG. 8 is a circuit diagram illustrating part of the first gray scale voltage generation circuit 36a of FIG. 6.

Note that, for convenience in description, a reference voltage inputted to the buffer 362 is referred to as VHx, and a voltage outputted from the differential amplification circuit 365 is referred to as VHXa, and resistances are respectively referred to as R1, R2, Ra, and Rb.

In FIG. 8, the output voltage VHxa is represented by the following equation:

$$VHxa = \{Rb(R1+R2)\}/\{R2(Ra+Rb)\} \times VHx - (R1/R2) \times Va \quad (5)$$

When R1 is set to be equal to Ra and R2 is set to be equal to Rb, this state is represented by the following equation:

$$VHxa = VHx - (R1/R2) \times Va \quad (6)$$

The equation (6) shows that: a voltage value obtained by subtracting a voltage value determined by the resistances R2, R1, and the adjustment voltage Va, from a certain standard gray scale voltage VHx is outputted as VHxa. FIG. 8 illustrates only adjustment of a positive polarity gray scale standard voltage, but the center values of the positive polarity gray scale voltage and the negative polarity gray scale voltage can be arbitrarily adjusted by performing the same correction with respect to a negative polarity gray scale standard voltage VLx as well. By correcting the center value of the standard gray scale voltage in accordance with the charge pull-in amount ΔV in the liquid crystal panel screen with use of this configuration, it is possible to reduce the flicker phenomenon in the panel screen.

Adoption of the foregoing configuration allows the source drivers to be independent from each other in setting the center values of the positive polarity gray scale voltage and the negative polarity gray scale voltage, thereby reducing the flicker phenomenon.

In more detail, in each source driver 3, the positive polarity gray scale voltage and the negative polarity gray scale voltage are increased so that the increment is equal to the charge pull-in amount ΔV of the pixel connected to a corresponding source signal line in accordance with inclination of the charge pull-in amounts ΔV in a gate scanning line direction, which is the first factor of the flicker phenomenon, and a center value of the positive polarity gray scale voltages and a center value of the negative polarity gray scale voltages are adjusted while maintaining a voltage actually applied to the liquid crystal (gray scale voltage-counter voltage), thereby reducing the first factor of the flicker phenomenon without changing the gray scale property (γ curve), that is, without varying the gray scale property.

Further, according to the foregoing configuration, in case where the deviation of the charge pull-in amounts ΔV in the panel screen which is caused by separate imaging of plural divided regions, i.e., the second factor of the flicker phenomenon is deviation in a horizontal direction, each source driver 3 (the source drivers 3 are minutely independent from each other) increases the positive polarity gray scale voltage and the negative polarity gray scale voltage so that the increment is equal to the charge pull-in amount ΔV of the pixel connected to a corresponding source signal line in accordance with the deviation of the charge pull-in amounts ΔV in a horizontal direction of a transfer block so as to adjust the center values of the positive polarity gray scale voltage and the negative polarity gray scale voltage. This makes it possible to reduce the second factor of the flicker phenomenon without changing the gray scale property.

Further, it should be particularly noted that, in the present embodiment, two circuits, i.e., the first gray scale voltage generation circuit 36a and the second gray scale voltage generation circuit 36b are provided for each source driver, and outputs thereof, i.e., the first standard gray scale voltage group (VH0a to VH63a, VL0a to V63a) and the second standard gray scale voltage group (VH0b to VH63b, VL0b to V63b) are respectively inputted via both the sides of the DA conversion circuit 37 having a resistor provided on a gray scale standard transmission line as illustrated in FIG. 3.

Thus, from an output left terminal to an output right terminal of each of the source drivers 3, correction values of the center values of the gray scale voltages can be continuously changed with an inclination dependent on a resistance ratio. That is, each source driver 3 can incline the center values of the positive polarity gray scale voltage and the negative polarity gray scale voltage outputted from the source driver 3, and the inclination can be made proximate to an optimal gray scale voltage center value by adjusting the first gray scale voltage adjustment signal DVa and the second gray scale voltage adjustment signal DVb to appropriate values. This makes it possible to further reduce the flicker phenomenon. Compared with a below-described comparative example, it is possible to exhibit great effect in reducing the flicker phenomenon in a liquid crystal display apparatus having less source drivers or in a liquid crystal display apparatus having a large display section.

Figure 9:
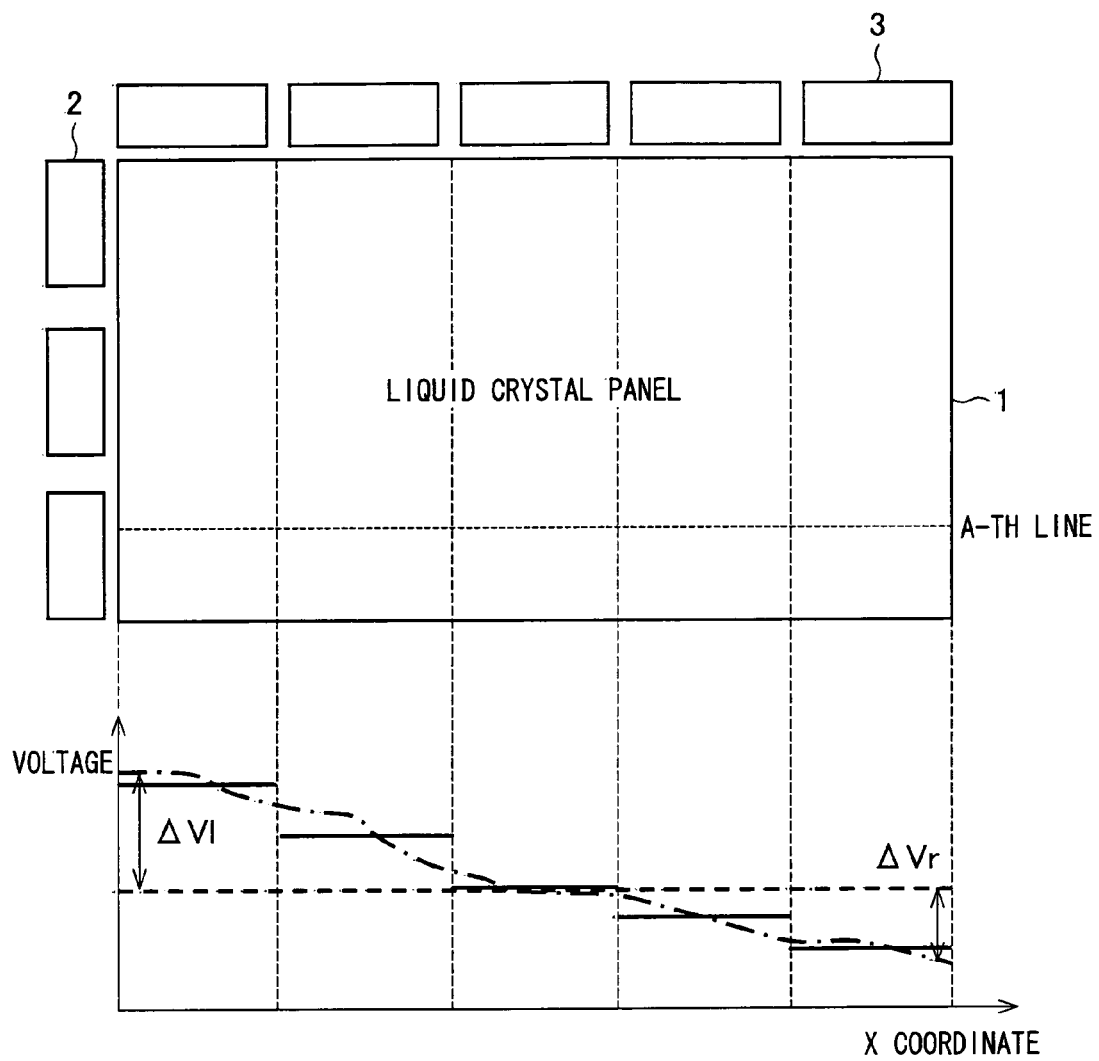
FIG. 9 is a graph illustrating comparison between a conventional art and a comparative example.
Figure 10:
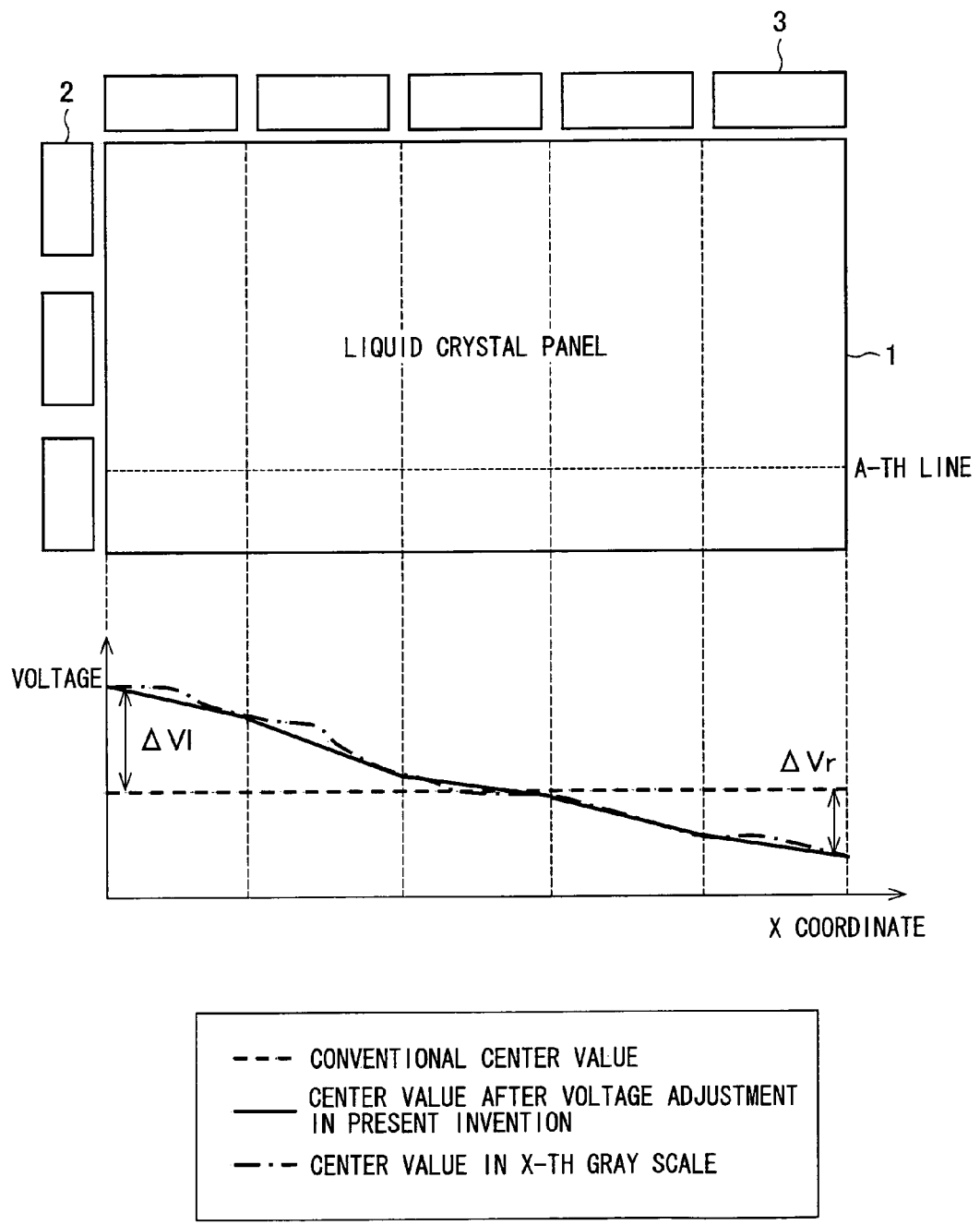
FIG. 10 is a graph illustrating comparison between a conventional art and an embodiment of the present invention.

According to the present embodiment, as to the method for reducing the flicker phenomenon caused by the horizontal-direction inclination of the charge pull-in amounts ΔV caused by the parasitic capacitances Cgd, it is possible to correct the horizontal-direction inclination of the charge pull-in amounts ΔV caused by the parasitic capacitances Cgd. This is described as follows with reference to the cases illustrated in FIGS. 9 and 10. Note that, first, the invention applied by the present inventors prior to the present invention will be briefly described as [Comparative Example].

In the invention described as [Comparative Example], a gray scale voltage adjustment section and an adjustment voltage generation circuit are provided on a gray scale voltage generation circuit, and only standard voltages VH0 to VH63 and VL0 to VL63 are generated by the gray scale voltage generation. Thus, unlike the present embodiment in which both terminals receive inputs, a single terminal of the DA conversion circuit of the subsequent stage receives an input.

Therefore, only a specific correction is performed with respect to a single source driver in correcting the horizontal-direction inclination of the charge pull-in amounts ΔV.

Consider a case where the center values of the positive polarity gray scale voltage and the negative polarity gray scale voltage for minimizing the flicker phenomenon are positioned on a chain line in an A-th line of the panel.

In a conventional source driver having no function for adjusting a gray scale voltage, i.e., having no gray scale voltage generation circuit, there is performed only such adjustment that a flicker phenomenon at a given point in the panel screen is not viewed by eyes. In case where the adjustment is performed at the center of the panel as illustrated by a dotted line of FIG. 9, the positive polarity gray scale voltage and the negative polarity gray scale voltage are unbalanced by AV1 and AVr in the left and right of the panel respectively, that is, the center values are uneven, which results in occurrence of the flicker phenomenon.

With the configuration of Comparative Example, in case where the gray scale voltage generation circuit is provided in the source driver as illustrated by a continuous line, each source driver can correct the center values of the positive polarity gray scale voltage and the negative polarity gray scale voltages, so that it is possible to improve the flicker unlike the conventional art. However, according to the Comparative Example, in case where adjustment for correcting the flicker phenomenon is performed on the basis of the center of the source driver, at an end point of the source driver, a center value of the positive polarity gray scale voltage and a center value of the negative polarity gray scale voltage for minimizing the flicker phenomenon is different from actual center values, so that it is impossible to strictly correct the flicker phenomenon.

Further, this problem is apparent in case where there are small number of source drivers or in case where a display screen area is large.

In contrast, according to the present embodiment, the center values have predetermined inclination in each source driver. This makes it possible to correct the continuous center values with the source drivers adjacent to each other. Thus, as illustrated by a continuous line of FIG. 10, the center values can be made proximate to the center values for minimizing the flicker phenomenon illustrated by a chain line.

Further, according to the present embodiment, it is possible to exhibit the following effect.

Figure 11:
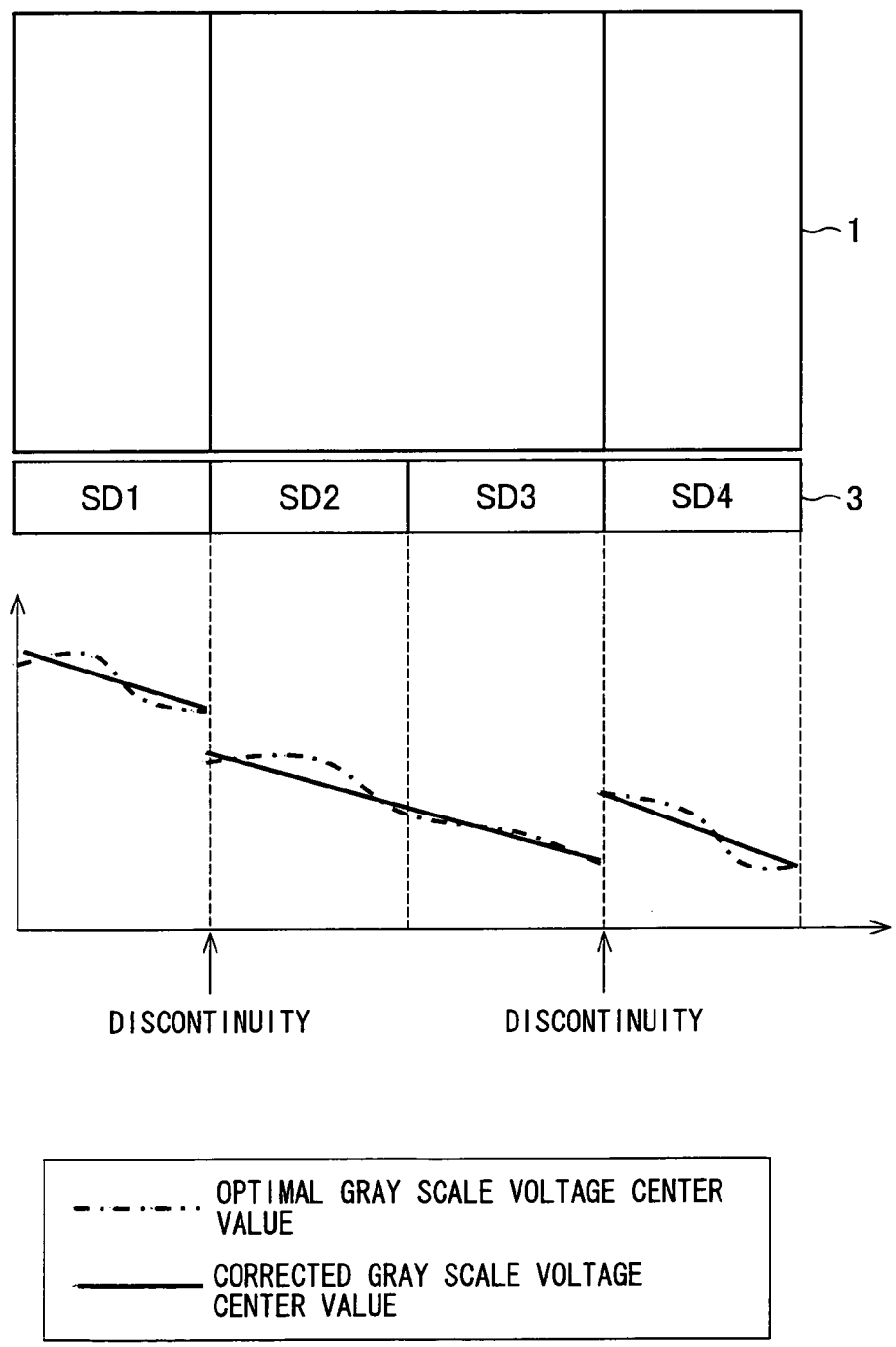
FIG. 11 is a graph illustrating a case where center values each minimizing a flicker phenomenon are discontinuous in a single panel.

As illustrated in FIG. 11, there is a case where the center values for minimizing the flicker phenomenon are not continuous in a single panel. The center values are not continuous between the source driver 3 (SD1) and the source driver 3 (SD2) and between the source driver 3(SD3) and the source driver 3 (SD4).

In contrast, according to the present embodiment, as described above, the source drivers 3 respectively adjust two center values, i.e., the center values of the positive polarity gray scale voltages and the negative polarity gray scale voltages.

Thus, even in case where the center values for minimizing the flicker are not continuous, it is possible to set the center values discontinuously as well by causing the source drivers 3 to independently adjust the center values of the positive polarity gray scale voltages and the negative polarity gray scale voltages as described above.

Embodiment 2

Another embodiment of the present invention is described as follows. The present embodiment describes only differences from Embodiment 1 and descriptions of the same configuration will be omitted here.

The charge pull-in amounts ΔV are deviated in the panel screen, and also gray scale voltages values applied to a drain region of the TFT are deviated (deviation of gray scale voltages). Generally, this deviation is referred to as "ω value".

As in Embodiment 1, it is possible to reduce the flicker phenomenon by increasing/adjusting gray scale voltages VH0a, VH63a, VL0a, and VL63a so that each increment/adjustment corresponds to the same adjustment voltage Va (also by increasing/adjusting gray scale voltages VH0b, VH63b, VL0b, and VL63b so that each increment/adjustment corresponds to the same adjustment voltage Va). Also, it is possible to further reduce the flicker phenomenon by correcting the c value with a highly free gray scale voltage adjustment function.

Thus, Embodiment 2 describes a liquid crystal display apparatus 10 which can correct the ca value, i.e., a deviation for each gray scale voltage.

Figure 12:
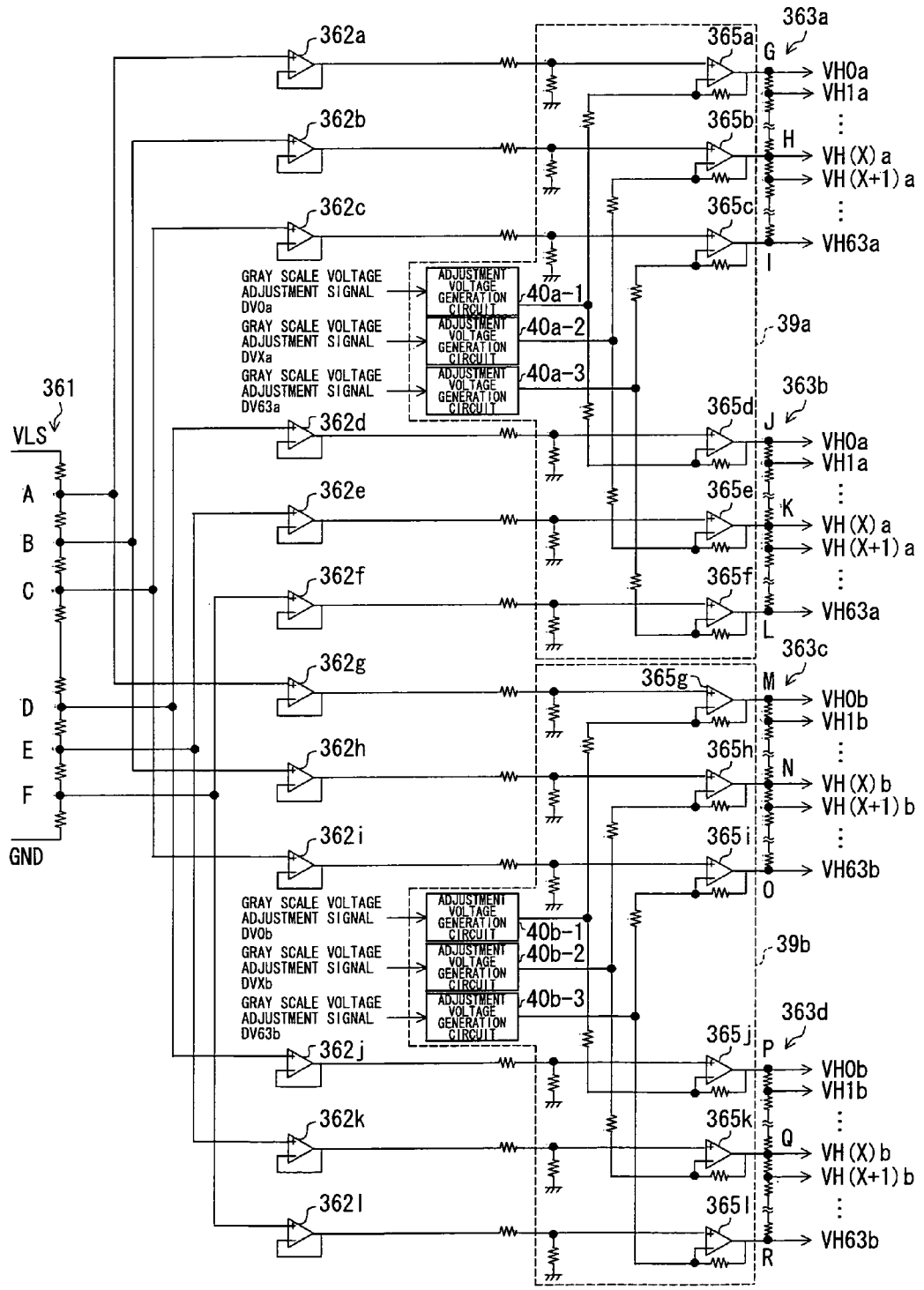
FIG. 12 is a circuit diagram illustrating an example of a configuration of a gray scale voltage generation circuit of another embodiment of the present invention.

FIG. 12 is a circuit diagram illustrating an example of a configuration of a gray scale voltage generation circuit 36 of the liquid crystal display apparatus 10 of Embodiment 2. The gray scale voltage generation circuit 36 includes: a first voltage divider circuit 361 for generating positive and negative reference voltages (predetermined reference voltages) from positive and negative standard voltages VLS and GND; buffers 362a to 362l each of which temporarily stores any one of the positive and negative plural reference voltages (resistance division voltages of points A to F); a second voltage divider circuit 363a for generating a positive polarity first standard gray scale voltage group (VH0a to VH63a) through resistance division by using positive polarity reference voltages (resistance division voltages of points A to C); a fourth voltage divider circuit 363b for generating a negative polarity first standard gray scale voltage group (VL63a to VL0a) through resistance division by using negative polarity reference voltages (resistance division voltages of points D to F); a third voltage divider circuit 363c for generating a positive polarity second standard gray scale voltage group (VH0b to VH63b) through resistance division by using positive polarity reference voltages (resistance division voltages of the points A to C); a fifth voltage divider circuit 363d for generating a negative polarity second standard gray scale voltage group (VL63b to VL0b) through resistance division by using negative polarity reference voltages (resistance division voltages of the points D to F); a first gray scale voltage adjustment section 39a for outputting a first adjustment voltage Va corresponding to the charge pull-in amount ΔV caused by the parasitic capacitance Cgd so that the first adjustment voltage Va is added to each of the reference voltages (resistance division voltages of the points A to F); and a second gray scale voltage adjustment section 39b for outputting a second adjustment voltage Vb corresponding to the charge pull-in amount ΔV caused by the parasitic capacitance Cgd so that the second adjustment voltage Vb is added to each of the reference voltages (resistance division voltages of the points A to F).

Further, the first gray scale voltage adjustment section 39a includes: first adjustment voltage generation circuits 40a-1, 40a-2, and 40a-3 for generating adjustment voltages respectively corresponding to gray scale voltage adjustment signals DVa, DVXa, and DV63a supplied from the control IC; and differential amplification circuits 365a to 365f whose input terminals respectively receive adjustment voltages from the first adjustment voltage generation circuits 40a-1, 40a-2, and 40a-3 or output voltages from the buffers 362a to 362f.

Meanwhile, the second adjustment voltage adjustment section 39b includes: second adjustment voltage generation circuits 40b-1, 40b-2, and 40b-3 for generating adjustment voltages respectively corresponding to gray scale voltage adjustment signals DVb, DVXb, and DV63b supplied from the control IC; and differential amplification circuits 365g to 365l whose input terminals respectively receive adjustment voltages from the second adjustment voltage generation circuits 40b-1, 40b-2, and 40b-3 or output voltages from the buffers 362g to 362l.

The first adjustment voltage generation circuits 40a-1, 40a-2, and 40a-3, and the second adjustment voltage generation circuits 40b-1, 40b-2, and 40b-3 do not change the gray scale property, so that the positive polarity gray scale voltage and the negative polarity gray scale voltage in the same gray scale are increased by the same voltage value (charge pull-in amount $\Delta V$) in adjusting the gray scale voltage, and the center values of the positive polarity gray scale voltage and the negative polarity gray scale voltage are adjusted while maintaining a voltage difference between the positive polarity gray scale voltage and the negative polarity gray scale voltage. For example, voltage values of VH(a) and VL(X) in an X-th gray scale are increased by the output adjustment voltage Va while maintaining a voltage value indicated by "VH(X)−VL(X)", thereby changing only the center values of VH(X) and VL(X).

A positive polarity input terminal of the differential amplification circuit 365a is connected to a junction between an output terminal of the buffer 362a connected via a resistor and an end of a resistor whose other end is grounded, and an output terminal of the first adjustment voltage generation circuit 40a-1 is connected to a negative polarity input terminal of the differential amplification circuit 365a via a resistor.

A positive polarity input terminal of the differential amplification circuit 365b is connected to a junction between an output terminal of the buffer 362b connected via a resistor and an end of a resistor whose other end is grounded, and an output terminal of the first adjustment voltage generation circuit 40a-2 is connected to a negative polarity input terminal of the differential amplification circuit 365b via a resistor.

A positive polarity input terminal of the differential amplification circuit 365c is connected to a junction between an output terminal of the buffer 362c connected via a resistor and an end of a resistor whose other end is grounded, and an output terminal of the first adjustment voltage generation circuit 40a-3 is connected to a negative polarity input terminal of the differential amplification circuit 365c via a resistor.

A positive polarity input terminal of the differential amplification circuit 365d is connected to a junction between an output terminal of the buffer 362d connected via a resistor and an end of a resistor whose other end is grounded, and the output terminal of the first adjustment voltage generation circuit 40a-1 is connected to a negative polarity input terminal of the differential amplification circuit 365d via a resistor.

A positive polarity input terminal of the differential amplification circuit 365e is connected to a junction between an output terminal of the buffer 362e connected via a resistor and an end of a resistor whose other end is grounded, and the output terminal of the first adjustment voltage generation circuit 40a-2 is connected to a negative polarity input terminal of the differential amplification circuit 365e via a resistor.

A positive polarity input terminal of the differential amplification circuit 365f is connected to a junction between an output terminal of the buffer 362f connected via a resistor and an end of a resistor whose other end is grounded, and the output terminal of the first adjustment voltage generation circuit 40a-3 is connected to a negative polarity input terminal of the differential amplification circuit 365f via a resistor.

A positive polarity input terminal of the differential amplification circuit 365g is connected to a junction between an output terminal of the buffer 362g connected via a resistor and an end of a resistor whose other end is grounded, and an output terminal of the second adjustment voltage generation circuit 40b-1 is connected to a negative polarity input terminal of the differential amplification circuit 365g via a resistor.

A positive polarity input terminal of the differential amplification circuit 365h is connected to a junction between an output terminal of the buffer 362h connected via a resistor and an end of a resistor whose other end is grounded, and an output terminal of the second adjustment voltage generation circuit 40b-2 is connected to a negative polarity input terminal of the differential amplification circuit 365h via a resistor.

A positive polarity input terminal of the differential amplification circuit 365i is connected to a junction between an output terminal of the buffer 362i connected via a resistor and an end of a resistor whose other end is grounded, and an output terminal of the second adjustment voltage generation circuit 40b-3 is connected to a negative polarity input terminal of the differential amplification circuit 365i via a resistor.

A positive polarity input terminal of the differential amplification circuit 365j is connected to a junction between an output terminal of the buffer 362j connected via a resistor and an end of a resistor whose other end is grounded, and the output terminal of the second adjustment voltage generation circuit 40b-1 is connected to a negative polarity input terminal of the differential amplification circuit 365j via a resistor.

A positive polarity input terminal of the differential amplification circuit 365k is connected to a junction between an output terminal of the buffer 362k connected via a resistor and an end of a resistor whose other end is grounded, and the output terminal of the second adjustment voltage generation circuit 40b-2 is connected to a negative polarity input terminal of the differential amplification circuit 365k via a resistor.

A positive polarity input terminal of the differential amplification circuit 365l is connected to a junction between an output terminal of the buffer 362l connected via a resistor and an end of a resistor whose other end is grounded, and the output terminal of the second adjustment voltage generation circuit 40b-3 is connected to a negative polarity input terminal of the differential amplification circuit 365l via a resistor.

An output terminal of the differential amplification circuit 365a is connected to a point G, in the second voltage divider circuit 363a, via which a maximum gray scale voltage VH0a having a positive polarity with respect to the counter voltage Vcom is outputted.

An output terminal of the differential amplification circuit 365b is connected to a point H, in the second voltage divider circuit 363a, via which an intermediate gray scale voltage VH(X)a having a positive polarity is outputted.

An output terminal of the differential amplification circuit 365c is connected to a point I, in the second voltage divider circuit 363a, via which a minimum gray scale voltage VH63a having a positive polarity is outputted.

An output terminal of the differential amplification circuit 365d is connected to a point J, in the fourth voltage divider circuit 363b, via which a maximum gray scale voltage VL63a having a negative polarity with respect to the counter voltage Vcom is outputted.

An output terminal of the differential amplification circuit 365e is connected to a point K, in the fourth voltage divider circuit 363b, via which an intermediate gray scale voltage VL(X)a having a negative polarity is outputted.

An output terminal of the differential amplification circuit 365f is connected to a point L, in the fourth voltage divider circuit 363b, via which a minimum gray scale voltage VL0a having a negative polarity is outputted.

An output terminal of the differential amplification circuit 365g is connected to a point M, in the third voltage divider circuit 363c, via which a maximum gray scale voltage VH0b having a positive polarity with respect to the counter voltage Vcom is outputted.

An output terminal of the differential amplification circuit 365h is connected to a point N, in the third voltage divider circuit 363c, via which an intermediate gray scale voltage VH(X) having a positive polarity is outputted.

An output terminal of the differential amplification circuit 365$i$ is connected to a point O, in the third voltage divider circuit 363$c$, via which a minimum gray scale voltage VH63$b$ having a positive polarity is outputted.

An output terminal of the differential amplification circuit 365$j$ is connected to a point P, in the fifth voltage divider circuit 363$d$, via which a maximum gray scale voltage VL63$b$ having a negative polarity with respect to the counter voltage Vcom is outputted.

An output terminal of the differential amplification circuit 365$k$ is connected to a point Q, in the fifth voltage divider circuit 363$d$, via which an intermediate gray scale voltage VL(X)$b$ having a negative polarity is outputted.

An output terminal of the differential amplification circuit 365$l$ is connected to a point R, in the fifth voltage divider circuit 363$d$, via which a minimum gray scale voltage VL0$b$ having a negative polarity is outputted.

As a result, out of gray scale voltages each having a positive polarity with respect to the counter voltage Vcom, the gray scale voltage whose voltage value is maximum, the gray scale voltage VH(X) whose voltage value is intermediate, and the gray scale voltage VH63 whose voltage value is minimum are adjusted for each gray scale, and out of gray scale voltages each having a negative polarity with respect to the counter voltage Vcom, the gray scale voltage VL63 whose voltage value is maximum, the gray scale voltage VL(X) whose voltage value is intermediate, and the gray scale voltage VL0 whose voltage value is minimum are adjusted for each gray scale.

As described above, according to Embodiment 2, the center values of the positive polarity gray scale voltage and the negative polarity gray scale voltage can be respectively adjusted for each gray scale, so that it is possible to further reduce the flicker phenomenon by inputting the gray scale voltage adjustment signals DV0$a$, DVX$a$, and DV63$a$, which are different from one another so as to correspond to respective gray scales, in a case where the charge pull-in amounts ΔV are deviated (ω value) between gray scales or a case where the center values of the positive polarity gray scale voltage and the negative polarity gray scale voltage for minimizing the flicker phenomenon are deviated (ω value) between gray scales.

Further, the control IC4 for controlling the voltage adjustment serves as means for setting a shift amount of the center values in accordance with a gray scale to be displayed in a pixel which is a driving target of the liquid crystal panel.

Note that, the gray scale voltage adjustment function is provide so as to cover three gray scales, i.e., a 0th gray scale, an X-th gray scale, and a 63rd gray scale, but the number of target gray scales does not have to be three. By providing the gray scale voltage adjustment function covering three or more gray scales, it is possible to more minutely adjust a deviation between gray scales.

Embodiment 3

Next, still another embodiment of the present invention is described as follows.

As in Embodiment 2, descriptions of the same configuration as those of Embodiments 1 and 2 will be omitted here.

Figure 13:
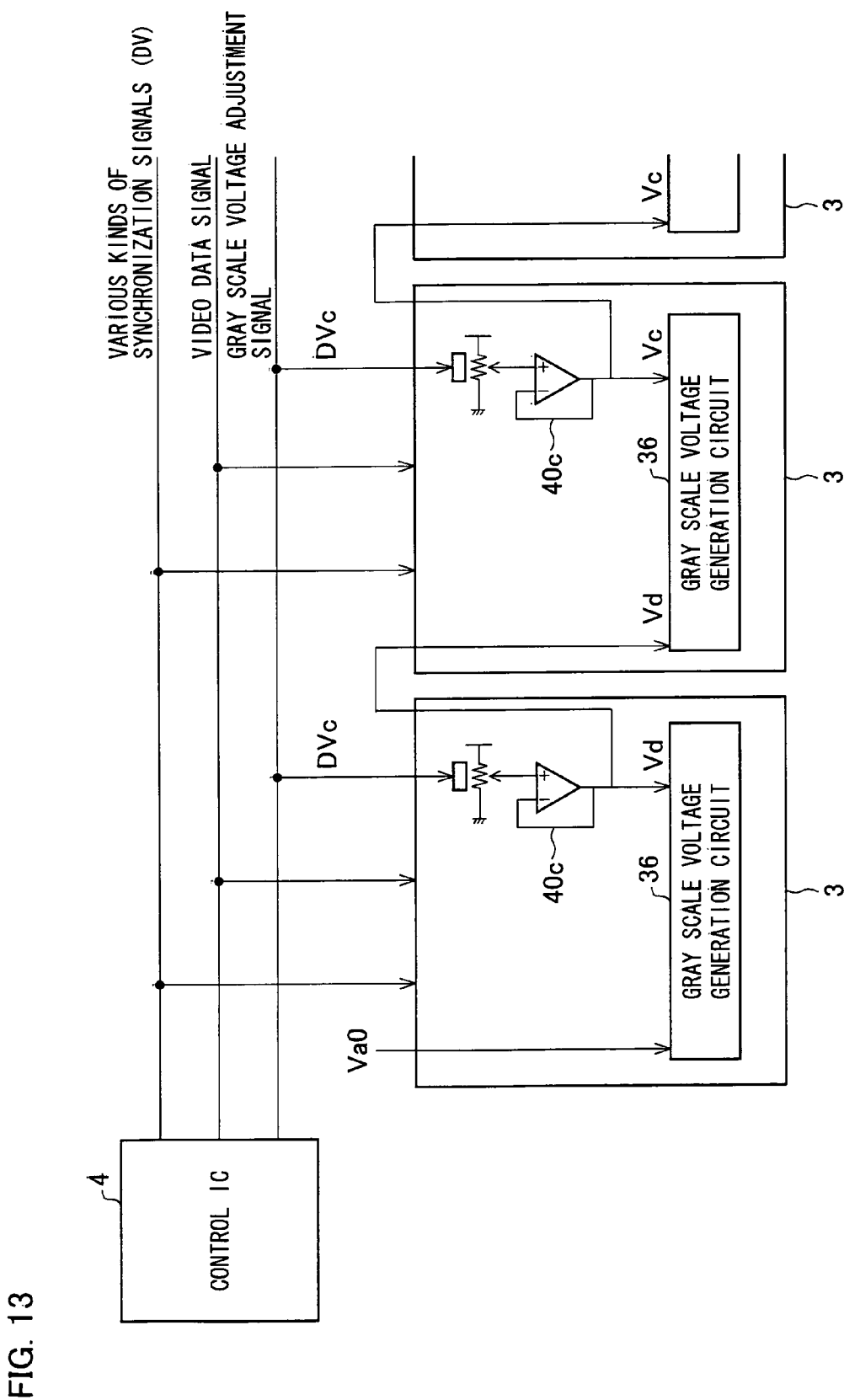
FIG. 13 is a circuit diagram illustrating an internal configuration of a source driver of still another embodiment of the present invention.

In Embodiment 3, each source driver 3 includes two adjustment voltage generation circuits, i.e., the adjustment voltage generation circuits 40$a$ and 40$b$. Meanwhile, in the present embodiment, each source driver 3 includes an adjustment voltage generation circuit (third gray scale voltage generation circuit) 40$c$ as illustrated in FIG. 13. More specifically, the adjustment voltage generation circuit 40$c$ is provided only on the right end (or the left end) of the source driver 3.

The following describes the case where the adjustment voltage generation circuit 40$c$ is provided only on the right end of the source driver 3.

In this case, a second source driver 3 provided on the right side of a first source driver 3 receives an output (Vd; fourth output adjustment voltage) from the adjustment voltage generation circuit 40$a$ or 40$b$ provided on the right end of the first source driver 3, and the adjustment voltage generation circuit 40$c$ generates a third output adjustment voltage Vc in accordance with a third gray scale voltage generation signal VDc. The deviation of the charge pull-in amounts ΔV in the screen is shifted so that the shift corresponds to a correction amount (first adjustment voltage Va) in accordance with these adjustment voltages V.

In case where an error occurs in a resistance value of the variable resistor 364$m$ in the adjustment voltage generation circuit 40$c$ for each source driver 3, correction amounts of the source drivers are different from each other, so that adjustment voltages are discontinuous. This may result in uneven display.

Figure 14:
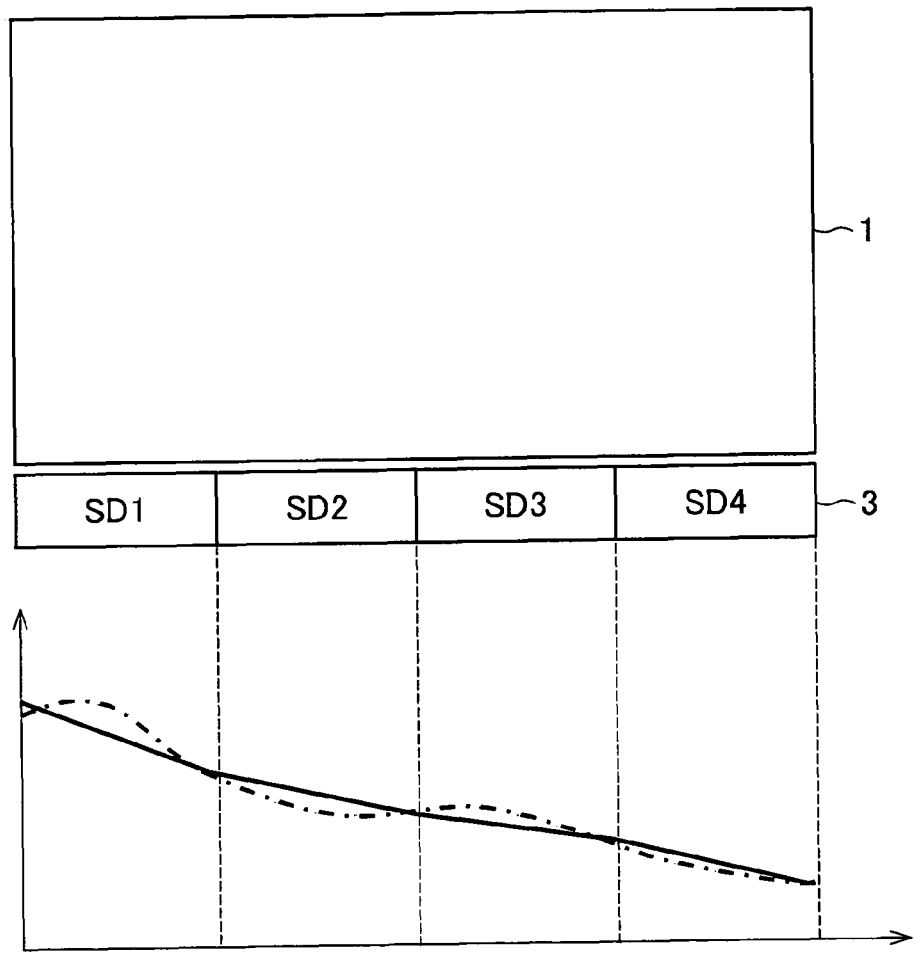
FIG. 14 is a graph illustrating center values observed in case of using the source driver of FIG. 13.

On the other hand, according to the foregoing configuration, adjustment voltages V of the source drivers 3 adjacent to each other are equal to each other. Thus, correction amounts of the source drivers 3 adjacent to each other are equal to each other, and it is possible to prevent the adjustment voltages from being discontinuous. That is, the center value illustrated in FIG. 14 can be obtained, so that smooth correction can be realized.

Further, only the adjustment voltage generation circuit 40$c$ is required, which results in lower cost. Further, a data amount of the gray scale voltage adjustment signal DVc inputted to the source driver 3.

The present invention is not limited to the description of the embodiments above, but may be altered by a skilled person within the scope of the claims. An embodiment based on a proper combination of technical means disclosed in different embodiments is encompassed in the technical scope of the present invention.

As described above, a liquid crystal display apparatus driving circuit of the present invention comprises a plurality of driving sections provided on a periphery of a display section in which a plurality of scanning signal lines and a plurality of video signal lines intersect with each other and a plurality of pixels are provided in a matrix manner, said plurality of driving sections each corresponding to a predetermined number of the video signal lines, said liquid crystal display apparatus driving circuit selectively supplying positive polarity gray scale voltages or negative polarity gray scale voltages to the video signal lines as video signals, each of the driving sections comprising: a gray scale voltage generation circuit for generating a gray scale voltage for display; and first and second gray scale voltage adjustment sections included in the gray scale voltage generation circuit, for increasing a positive polarity gray scale voltage and a negative polarity gray scale voltage while maintaining a voltage difference between the positive polarity gray scale voltage and the negative polarity gray scale voltage and respectively adjust a center potential of the positive polarity gray scale voltage and a center potential of the negative polarity gray scale voltage.

Further, as described above, a liquid crystal display apparatus driving circuit of the present invention comprises a plurality of driving sections provided on a periphery of a display section in which a plurality of scanning signal lines and a plurality of video signal lines intersect with each other and a plurality of pixels are provided in a matrix manner, said plurality of driving sections each corresponding to a predetermined number of the video signal lines, said liquid crystal display apparatus driving circuit selectively supplying positive polarity gray scale voltages or negative polarity gray scale voltages to the video signal lines as video signals, each of the driving sections comprising: a gray scale voltage generation circuit for generating a gray scale voltage for display; and first and second gray scale voltage adjustment sections included in the gray scale voltage generation circuit, for increasing a positive polarity gray scale voltage and a negative polarity gray scale voltage while maintaining a voltage difference between the positive polarity gray scale voltage and the negative polarity gray scale voltage and respectively adjust a center potential of the positive polarity gray scale voltage and a center potential of the negative polarity gray scale voltage, wherein the driving section inclines center potentials of the corresponding positive polarity gray scale voltages and the corresponding negative polarity gray scale voltages.

Thus, it is possible to provide the liquid crystal display apparatus driving circuit which can make the center values of the positive polarity gray scale voltage and the negative polarity gray scale voltage proximate to values each of which makes it possible to further reduce the flicker phenomenon.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a display on which a capacitance type touch panel is installed.

The invention claimed is:

1. A liquid crystal display apparatus driving circuit, comprising a plurality of driving sections provided on a periphery of a display section in which a plurality of scanning signal lines and a plurality of video signal lines intersect with each other and a plurality of pixels are provided in a matrix manner, said plurality of driving sections each corresponding to a number of the video signal lines, said liquid crystal display apparatus driving circuit configured to selectively supply positive polarity gray scale voltages or negative polarity gray scale voltages to the video signal lines as video signals,
each of the driving sections comprising:
a gray scale voltage generation circuit for generating a gray scale voltage for display; and
first and second gray scale voltage adjusters included in the gray scale voltage generation circuit, for increasing a positive polarity gray scale voltage and a negative polarity gray scale voltage while maintaining a voltage difference between the positive polarity gray scale voltage and the negative polarity gray scale voltage and respectively adjust a center potential of the positive polarity gray scale voltage and a center potential of the negative polarity gray scale voltage.

2. A liquid crystal display apparatus driving circuit, comprising a plurality of driving sections provided on a periphery of a display section in which a plurality of scanning signal lines and a plurality of video signal lines intersect with each other and a plurality of pixels are provided in a matrix manner, said plurality of driving sections each corresponding to a number of the video signal lines, said liquid crystal display apparatus driving circuit configured to selectively supply positive polarity gray scale voltages or negative polarity gray scale voltages to the video signal lines as video signals,
each of the driving sections comprising:
a gray scale voltage generation circuit for generating a gray scale voltage for display; and
first and second gray scale voltage adjusters included in the gray scale voltage generation circuit, for increasing a positive polarity gray scale voltage and a negative polarity gray scale voltage while maintaining a voltage difference between the positive polarity gray scale voltage and the negative polarity gray scale voltage and for respectively adjusting a center potential of the positive polarity gray scale voltage and a center potential of the negative polarity gray scale voltage, wherein
the driving section is configured to incline center potentials of the corresponding positive polarity gray scale voltages and the corresponding negative polarity gray scale voltages.

3. The liquid crystal display apparatus driving circuit as set forth in claim 1, each of the driving sections comprising a DA conversion circuit provided as a subsequent stage of the gray scale voltage generation circuit, wherein
the DA conversion circuit includes:
a first input terminal for receiving the positive polarity gray scale voltage and the negative polarity gray scale voltage outputted from the first gray scale voltage adjuster;
a second input terminal for receiving the positive polarity gray scale voltage and the negative polarity gray scale voltage outputted from the second gray scale voltage adjuster; and
resistors respectively corresponding to intersections of (I) the transmission lines each connecting the first input terminal and the second input terminal and (II) signal lines respectively connected to the video lines.

4. The liquid crystal display apparatus driving circuit as set forth in claim 1, wherein
the first gray scale voltage adjuster and the second gray-scale voltage adjuster are configured to adjust the center potential of the positive polarity gray scale voltage and the center potential of the negative polarity gray scale voltage in accordance with inclination of a charge pull-in amount ΔV in the display section.

5. The liquid crystal display apparatus driving circuit as set forth in claim 1, wherein
the first gray scale voltage adjuster includes a first adjustment voltage generation circuit for generating a first output adjustment voltage by using a first gray scale voltage adjustment signal supplied from the outside, and the second gray scale voltage adjuster includes a second adjustment voltage generation circuit for generating a second output adjustment voltage by using a second gray scale voltage adjustment signal supplied from the outside.

6. The liquid crystal display apparatus driving circuit as set forth in claim 1, wherein each of the driving sections is arranged so that one of the first gray scale voltage adjuster and the second gray scale voltage adjuster includes a third adjustment voltage generation circuit for generating a third output adjustment voltage by using a third gray scale voltage adjustment signal supplied from the outside, and the other of the first gray scale voltage adjuster and the second gray scale voltage adjuster is configured to receives a fourth output adjustment voltage generated by an adjacent driving section.

7. The liquid crystal display apparatus driving circuit as set forth in claim 5, wherein the first adjustment voltage generation circuit and the second adjustment voltage generation circuit are provided for every first number of gray scales, and adjust the center potentials for every first number of gray scales.

8. The liquid crystal display apparatus driving circuit as set forth in claim 6, wherein the third adjustment voltage generation circuit is provided for every first number of gray scales, and is configured to adjusts the center potentials for every first number of gray scales.

9. The liquid crystal display apparatus driving circuit as set forth in claim 5, wherein the first adjustment voltage generation circuit includes:
a variable resistor element whose resistance value is variable in accordance with a voltage value of the first gray scale voltage adjustment signal; and
a buffer section for buffering an output from the variable resistor element.

10. The liquid crystal display apparatus driving circuit as set forth in claim 7, wherein the first adjustment voltage generation circuit includes:
a variable resistor element whose resistance value is variable in accordance with a voltage value of the first gray scale voltage adjustment signal; and
a buffer section for buffering an output from the variable resistor element.

11. The liquid crystal display apparatus driving circuit as set forth in claim 5, wherein the second adjustment voltage generation circuit includes:
a variable resistor element whose resistance value is variable in accordance with a voltage value of the second gray scale voltage adjustment signal; and
a buffer section for buffering an output from the variable resistor element.

12. The liquid crystal display apparatus driving circuit as set forth in claim 7, wherein the second adjustment voltage generation circuit includes:
a variable resistor element whose resistance value is variable in accordance with a voltage value of the second gray scale voltage adjustment signal; and
a buffer section for buffering an output from the variable resistor element.

13. The liquid crystal display apparatus driving circuit as set forth in claim 6, wherein the third adjustment voltage generation circuit includes:
a variable resistor element whose resistance value is variable in accordance with a voltage value of the third gray scale voltage adjustment signal; and
a buffer section for buffering an output from the variable resistor element.

14. The liquid crystal display apparatus driving device as set forth in claim 8, wherein the third adjustment voltage generation circuit includes:
a variable resistor element whose resistance value is variable in accordance with a voltage value of the third gray scale voltage adjustment signal; and
a buffer section for buffering an output from the variable resistor element.

15. The liquid crystal display apparatus driving circuit as set forth in claim 9, wherein the variable resistor element is a potentiometer.

16. The liquid crystal display apparatus driving circuit as set forth in claim 5, wherein
the gray scale voltage generation circuit includes:
a first voltage division circuit for generating a plurality of positive and negative reference voltages from positive and negative standard voltages; second and third voltage division circuits each of which generates a positive polarity gray scale voltage from a positive polarity reference voltage; and fourth and fifth voltage division circuits each of which generates a negative polarity gray scale voltage from a negative polarity reference voltage, and
the first gray scale voltage adjuster is configured to output, to one of the second voltage division circuit and the third voltage division circuit and one of the fourth voltage division circuit and the fifth voltage division circuit, (i) a voltage obtained by increasing each of the reference voltages of the first voltage division circuit so that an increment is equal to an output adjustment voltage or (ii) a voltage corresponding to said voltage obtained, and
the second gray scale voltage adjuster is configured to output, to the other of the second voltage division circuit and the third voltage division circuit and the other of the fourth voltage division circuit and the fifth voltage division circuit, (a) another voltage obtained by increasing each of the reference voltages of the first voltage division circuit so that an increment is equal to another output adjustment voltage or (b) a voltage corresponding to said another voltage obtained.

17. A liquid crystal display apparatus, comprising:
a liquid crystal display apparatus driving circuit as set forth in claim 1;
a control section for controlling the liquid crystal display apparatus driving circuit; and
a display panel.

18. The liquid crystal display apparatus driving circuit as set forth in claim 1, wherein each of the driving sections is a source driver.

19. A liquid crystal display apparatus source driver, provided as each of the driving sections on the liquid crystal display apparatus driving circuit as set forth in claim 1.

20. A liquid crystal display apparatus controller, comprising a control section for controlling the liquid crystal display apparatus driving circuit as set forth in claim 1.

* * * * *